US012199359B2

(12) United States Patent
Kim

(10) Patent No.: US 12,199,359 B2
(45) Date of Patent: Jan. 14, 2025

(54) ANTENNA SYSTEM MOUNTED ON VEHICLE

(71) Applicant: LG ELECTRONICS INC., Seoul (KR)

(72) Inventor: Changil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 183 days.

(21) Appl. No.: 17/755,804

(22) PCT Filed: Nov. 22, 2019

(86) PCT No.: PCT/KR2019/016086

§ 371 (c)(1),
(2) Date: May 9, 2022

(87) PCT Pub. No.: WO2021/100924

PCT Pub. Date: May 27, 2021

(65) Prior Publication Data

US 2022/0384955 A1 Dec. 1, 2022

(51) Int. Cl.

| | |
|---|---|
| ***H01Q 7/00*** | (2006.01) |
| ***H01Q 1/22*** | (2006.01) |
| ***H01Q 1/32*** | (2006.01) |
| ***H01Q 1/36*** | (2006.01) |
| ***H01Q 1/52*** | (2006.01) |
| ***H01Q 5/307*** | (2015.01) |
| ***H01Q 21/28*** | (2006.01) |

(52) U.S. Cl.

CPC ................. *H01Q 7/00* (2013.01); *H01Q 1/22* (2013.01); *H01Q 1/3275* (2013.01); *H01Q 1/36* (2013.01); *H01Q 1/52* (2013.01); *H01Q 5/307* (2015.01); *H01Q 21/28* (2013.01)

(58) Field of Classification Search

None

See application file for complete search history.

(56) References Cited

U.S. PATENT DOCUMENTS 8,723,733 B2 * 5/2014 Tran ......................... H01Q 1/38 343/893

2006/0044196 A1 3/2006 Grant et al.

(Continued)

FOREIGN PATENT DOCUMENTS

KR 1020120125036 11/2012

KR 1020160098959 8/2016

OTHER PUBLICATIONS

PCT International Application No. PCT/KR2019/016086, International Search Report dated Aug. 21, 2020, 2 pages.

*Primary Examiner* — Dameon E Levi

*Assistant Examiner* — Anh N Ho

(74) *Attorney, Agent, or Firm* — LEE, HONG, DEGERMAN, KANG & WAIMEY

(57) ABSTRACT

An antenna system mounted on a vehicle according to the present invention comprises: a first antenna comprising a plurality of conductive members and operating as a radiator in a first frequency band; and a second antenna disposed in the antenna system separate from the first antenna, and operating in a second frequency band higher than the first frequency band. The first antenna may include a loop antenna configured in a loop shape to surround the plurality of conductive members such that signals from the plurality of conductive members are coupled.

14 Claims, 19 Drawing Sheets

(56) References Cited

U.S. PATENT DOCUMENTS

| | | | | |
|---|---|---|---|---|
| 2010/0093390 | A1* | 4/2010 | Waku | H01Q 21/29 343/702 |
| 2012/0280888 | A1* | 11/2012 | Thiam | H01Q 5/371 343/893 |
| 2016/0164169 | A1* | 6/2016 | Krogerus | H01Q 21/28 343/702 |
| 2017/0279199 | A1* | 9/2017 | An | H01Q 5/335 |
| 2018/0123244 | A1 | 5/2018 | An et al. | |

* cited by examiner (a)

(b)

(a)

(b)

(c)

ANTENNA SYSTEM MOUNTED ON VEHICLE

CROSS-REFERENCE TO RELATED APPLICATIONS

This application is the National Stage filing under 35 U.S.C. 371 of International Application No. PCT/KR2019/016086, filed on Nov. 22, 2019, the contents of which are all incorporated by reference herein in its entirety.

TECHNICAL FIELD

The present disclosure relates to an antenna system mounted on a vehicle. One particular implementation relates to an antenna system having a broadband antenna that is capable of operating in various communication systems, and to a vehicle having the same.

BACKGROUND ART

Electronic devices may be divided into mobile/portable terminals and stationary terminals according to mobility. Also, the electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive broadcast and multicast signals to allow viewing of video or television programs As it becomes multifunctional, an electronic device can be allowed to capture still images or moving images, play music or video files, play games, receive broadcast and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated to provide 5G communication services.

In this regard, the mobile terminal may be configured to provide 5G communication services in various frequency bands. Recently, attempts have been made to provide 5G communication services using a Sub-6 band under a 6 GHz band. In the future, it is also expected to provide 5G communication services by using a millimeter-wave (mmWave) band in addition to the Sub-6 band for a faster data rate.

Recently, the necessity of providing such a communication service through a vehicle is increasing. Meanwhile, there is a need for a fifth generation (5G) communication service, which is a next generation communication service, as well as existing communication services such as LTE (Long Term Evolution) and the like in relation to communication services.

Accordingly, broadband antennas operating in both the LTE frequency bands and the 5G Sub6 frequency bands need to be disposed in a vehicle other than an electronic device. However, broadband antennas such as cone antennas have problems in that a vertical profile and a weight increase due to an increase in an overall antenna size, particularly, a height.

In addition, the broadband antennas such as the cone antennas may be implemented in a three-dimensional structure compared to related art planar antennas. In addition, multiple-input/multi-output (MIMO) should be implemented in an electronic device or vehicle to improve communication reliability and communication capacity. To this end, it is necessary to arrange a plurality of broadband antennas in the electronic device or vehicle.

This causes a problem that any detailed arrangement structure has not been taught to arrange cone antennas having such a three-dimensional structure in an electronic device or vehicle while maintaining a low interference level among the cone antennas.

In addition, it is necessary to improve antenna performance while maintaining a low profile structure in the three-dimensional antenna system. However, in the three-dimensional antenna system, a mechanical structure for fixing the antenna in a vehicle is required while securing a height of an antenna itself. This may cause a problem that the antenna performance should be improved while maintaining the mechanical structure to be equal to or lower than a predetermined height.

When the antenna system is mounted on the vehicle, a plurality of antennas may be disposed. Among these antennas, antennas operating in a low band (LB) of 600 MHz to 960 MHz have a difficulty in satisfying performance in the corresponding band. In addition, there is a problem in that radiation performance of the antenna operating in the low band LB decreases in a horizontal direction with respect to the vehicle.

Accordingly, there is a need for an antenna design capable of optimizing the radiation performance in the horizontal direction while the antenna operating in the low band LB operates in a wide frequency band.

DISCLOSURE OF INVENTION

Technical Problem

The present disclosure is directed to solving the aforementioned problems and other drawbacks. The present disclosure also describes improvement of antenna performance while maintaining a height of an antenna system mounted on a vehicle to be lower than or equal to a predetermined height.

The present disclosure further describes a structure for mounting an antenna system, which is capable of operating in a wide frequency band to support various communication systems, on a vehicle.

The present disclosure further describes an antenna configuration capable of operating in a wide frequency band in a low band (LB).

The present disclosure further describes an antenna configuration capable of improving radiation performance in a horizontal direction while operating in a wide frequency band in a low band (LB).

Solution to Problem

In order to achieve the above or other aspects of the subject matter disclosed herein, there is provided an antenna system mounted on a vehicle. The antenna system may include a first antenna including a plurality of conductive members and operating as a radiator in a first frequency band, a second antenna disposed in the antenna system separately from the first antenna and operating in a second frequency band higher than the first frequency band. The first antenna may include a loop antenna having a loop shape to surround a plurality of conductive members such that signals from the plurality of conductive members are coupled.

According to one implementation, the antenna system may further include a transceiver circuit configured to control a signal to be radiated through at least one of the first antenna and the second antenna.

According to one implementation, the first antenna may include a first low band (LB) antenna including a plurality of conductive members, and having one end connected to a feeding line and another end connected to a ground to implement a closed loop. The first antenna may further include a second LB antenna including a plurality of other conductive members, and having one end connected to a second feeding line and another end connected to a ground to implement a closed loop.

According to one implementation, the antenna system may further include a first Wireless Local Area Network (WLAN) antenna and a second WLAN antenna disposed between the first LB antenna and the second LB antenna and each including conductive members disposed parallel to a lower substrate.

According to one implementation, the antenna system may further include a Remote Keyless Entry (RKE) antenna disposed between the first WLAN antenna and the second WLAN antenna, and having one end connected to a feeding line and another end connected to a ground to implement a closed loop. Here, a radiation loop region defined by the RKE antenna may be formed in a boundary region of the antenna system rather than a region in which the loop antenna is disposed.

According to one implementation, the loop antenna may include a vertical loop antenna surrounding a region in which the first antenna and the second antenna are disposed, and disposed substantially perpendicular to a lower substrate. The loop antenna may further include a horizontal loop antenna connected to the vertical loop antenna and disposed substantially parallel to the lower substrate. Here, the horizontal loop antenna may be disposed between ends of the plurality of conductive members and a radiating loop region of the RKE antenna.

According to one implementation, the plurality of conductive members may be disposed substantially perpendicular to a lower substrate. An arrangement shape of the first LB antenna and an arrangement shape of the second LB antenna may be different from each other to improve isolation between the first LB antenna and the second LB antenna.

According to one implementation, the vertical loop antenna and the plurality of conductive members may be disposed substantially parallel to each other. A height of the vertical loop antenna may be higher than a height of the plurality of conductive members so as to improve signal reception performance of the first frequency band in a horizontal direction in which the antenna system is mounted.

According to one implementation, the second antenna may include a plurality of cone radiators, metal patches disposed at the plurality of cone radiators, respectively, with being spaced apart from one another by predetermined distances so as to be coupled to signals from upper apertures of the cone radiators, and shorting pins configured to connect the metal patches and a lower substrate.

According to one implementation, the metal patch and the shorting pin may be disposed in a vertical symmetrical shape with respect to a cone radiator disposed on an upper portion and another cone radiator disposed on a lower portion.

According to one implementation, the vertical loop antenna may be located at a position higher than a position where the plurality of conductive members configuring the second antenna are disposed.

According to one implementation, the antenna system may further include a baseband processor connected to the transceiver circuit and configured to control the transceiver circuit to perform multiple-input/multi-output (MIMO) through the first antenna in the first frequency band.

According to one implementation, the baseband processor may control the transceiver circuit to perform MIMO through the second antenna in the second frequency band when signal quality received through the first antenna is equal to or lower than a threshold.

According to one implementation, the second antenna may include a plurality of cone antennas including cone radiators and patch antennas, the antenna system may further include a baseband processor configured to perform MIMO through the plurality of cone antennas. The baseband processor may perform MIMO in the first frequency band through the first antenna and at least one of the plurality of cone antennas.

According to one implementation, the first antenna may operate as a radiator in a low band that is a first frequency band, and the second antenna may operate as a radiator in a second frequency band that is higher than the first frequency band. The antenna system may further include a baseband processor configured to perform carrier aggregation (CA) by receiving a first signal of the first frequency band through the first antenna and a second signal of the second frequency band through the second antenna.

In order to achieve the above or other aspects of the subject matter disclosed herein, there is provided a vehicle including an antenna system. The vehicle may include a first antenna including a plurality of conductive members and operating as a radiator in a first frequency band, a second antenna disposed in the antenna system separately from the first antenna and operating in a second frequency band higher than the first frequency band, a transceiver circuit configured to control a signal to be radiated through at least one of the first antenna and the second antenna, and a baseband processor configured to communicate with at least one of an adjacent vehicle, a Road Side Unit (RSU), and a base station through the transceiver circuit.

According to one implementation, the first antenna may include the plurality of conductive members, and a loop antenna having a loop shape to surround the plurality of conductive members such that signals from the plurality of conductive members are coupled.

According to one implementation, the baseband processor may control the transceiver circuit to receive a first signal of the first frequency band from a first entity through the first antenna, and a second signal of the second frequency band from a second entity through the second antenna. The baseband processor may perform communication with a base station that is the first entity, and perform V2V communication with another vehicle that is the second entity.

Advantageous Effects of Invention

Hereinafter, technical effects of an antenna system mounted on a vehicle and a vehicle equipped with the antenna system will be described.

According to the present disclosure, a radiation pattern of a low band (LB) antenna can be improved in a horizontal direction in an antenna system mounted in a vehicle.

Also, radiation efficiency can be improved while the LB antenna can operate in a broadband frequency in the antenna system mounted in the vehicle.

In addition, interference between different antennas can be reduced in the antenna system mounted in the vehicle.

According to an implementation, a structure for mounting an antenna system, which can operate in a broad band, in a vehicle can be provided to support various communication systems by implementing a low band (LB) antenna and other antennas in one antenna module.

According to an implementation, the antenna system can be optimized with different antennas in the low band LB and other bands. This can result in arranging the antenna system with optimal configuration and performance in a roof frame of the vehicle.

According to the present disclosure, the antenna system of the vehicle can implement MIMO and diversity operations using a plurality of antennas in specific bands.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

MODE FOR THE INVENTION

Figure 1:
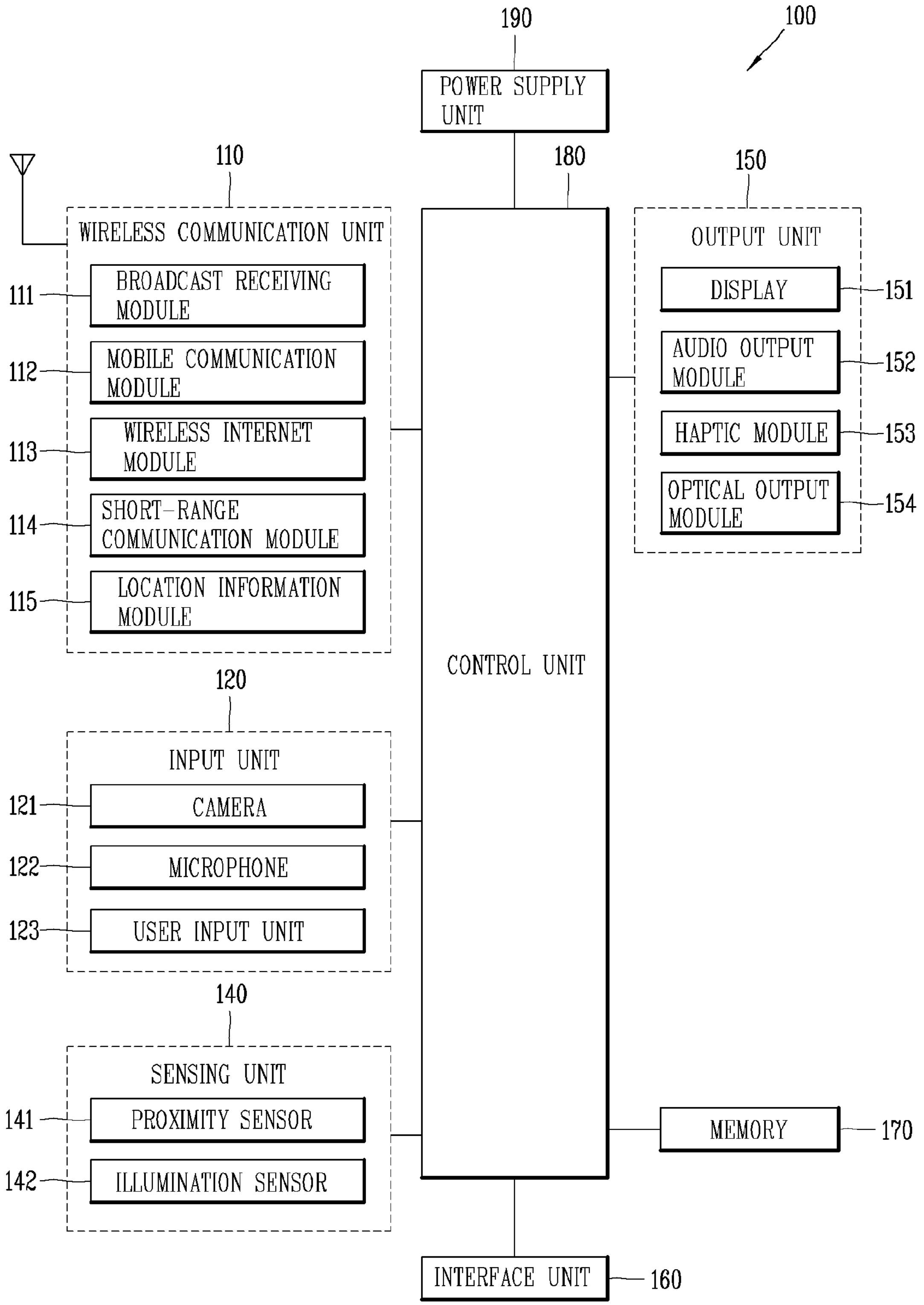
FIG. 1 is a block diagram of an electronic device in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

On the other hand, an antenna system mounted on a vehicle disclosed in this specification mainly refers to an antenna system disposed on an outside of the vehicle, but may also include a mobile terminal (electronic device) belonging to a user aboard the vehicle.

FIG. 1 is a block diagram of an electronic device in accordance with the present disclosure. Here, the electronic device may include a mobile terminal (electronic device) disposed inside the vehicle or carried by a user who is on board the vehicle. Also, a vehicle in which a communication system such as an antenna system is mounted may be referred to as an electronic device.

The electronic device 100 may be shown having components such as a wireless communication unit 110, an input unit 120, a sensing unit 140, an output unit 150, an interface unit 160, a memory 170, a controller 180, and a power supply unit 190. It is understood that implementing all of the illustrated components illustrated in FIG. 1 is not a requirement, and that greater or fewer components may alternatively be implemented.

In more detail, among others, the wireless communication unit 110 may typically include one or more modules which permit communications such as wireless communications between the electronic device 100 and a wireless communication system, communications between the electronic device 100 and another electronic device, or communications between the electronic device 100 and an external server. Further, the wireless communication unit 110 may typically include one or more modules which connect the electronic device 100 to one or more networks. Here, the one or more networks may be, for example, a 4G communication network and a 5G communication network.

The wireless communication unit 110 may include at least one of a 4G wireless communication module 111, a 5G wireless communication module 112, a short-range communication module 113, and a location information module 114.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station.

In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) structure. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network. In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE re-farming. In some examples, a Sub 6 frequency band, which is a range of 6 GHz or less, may be used as the 5G frequency band.

On the other hand, a millimeter-wave (mmWave) range may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication unit 110 may be in a Dual Connectivity (DC) state with the 4G base station and the 5G base station through the 4G wireless communication module 111 and the 5G wireless communication module 112. As such, the dual connectivity with the 4G base station and the 5G base station may be referred to as EUTRAN NR DC (EN-DC). Here, EUTRAN is an abbreviated form of "Evolved Universal Telecommunication Radio Access Network", and refers to a 4G wireless communication system. Also, NR is an abbreviated form of "New Radio" and refers to a 5G wireless communication system.

On the other hand, if the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+ WiFi CA may be performed using the 4G wireless communication module 111 and the Wi-Fi communication module 113. Or, 5G+ WiFi CA may be performed using the 5G wireless communication module 112 and the Wi-Fi communication module 113.

The location information module 114 may be generally configured to detect, calculate, derive or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication unit 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module 112, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensor unit 140 may typically be implemented using one or more sensors configured to sense internal information of the electronic device, the surrounding environment of the electronic device, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user.

The interface unit 160 serves as an interface with various types of external devices that are coupled to the electronic device 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the electronic device 100 may perform assorted control functions associated with a connected external device, in response to the external device being connected to the interface unit 160.

The memory 170 is typically implemented to store data to support various functions or features of the electronic device 100. For instance, the memory 170 may be configured to store application programs executed in the electronic device 100, data or instructions for operations of the electronic device 100, and the like. Some of these application programs may be downloaded from an external server via wireless communication. Other application programs may be installed within the electronic device 100 at the time of manufacturing or shipping, which is typically the case for basic functions of the electronic device 100 (for example, receiving a call, placing a call, receiving a message, sending a message, and the like). It is common for application programs to be stored in the memory 170, installed in the electronic device 100, and executed by the controller 180 to perform an operation (or function) for the electronic device 100.

The controller 180 typically functions to control an overall operation of the electronic device 100, in addition to the operations associated with the application programs. The control unit 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the controller 180 may control a combination of at least two of those components included in the electronic device 100 to activate the application program.

The power supply unit 190 may be configured to receive external power or provide internal power in order to supply appropriate power required for operating elements and components included in the electronic device 100. The power supply unit 190 may include a battery, and the battery may be configured to be embedded in the terminal body, or configured to be detachable from the terminal body.

At least part of the components may cooperably operate to implement an operation, a control or a control method of an electronic device according to various implementations disclosed herein. Also, the operation, the control or the control method of the electronic device may be implemented on the electronic device by an activation of at least one application program stored in the memory 170.

Figure 2A:
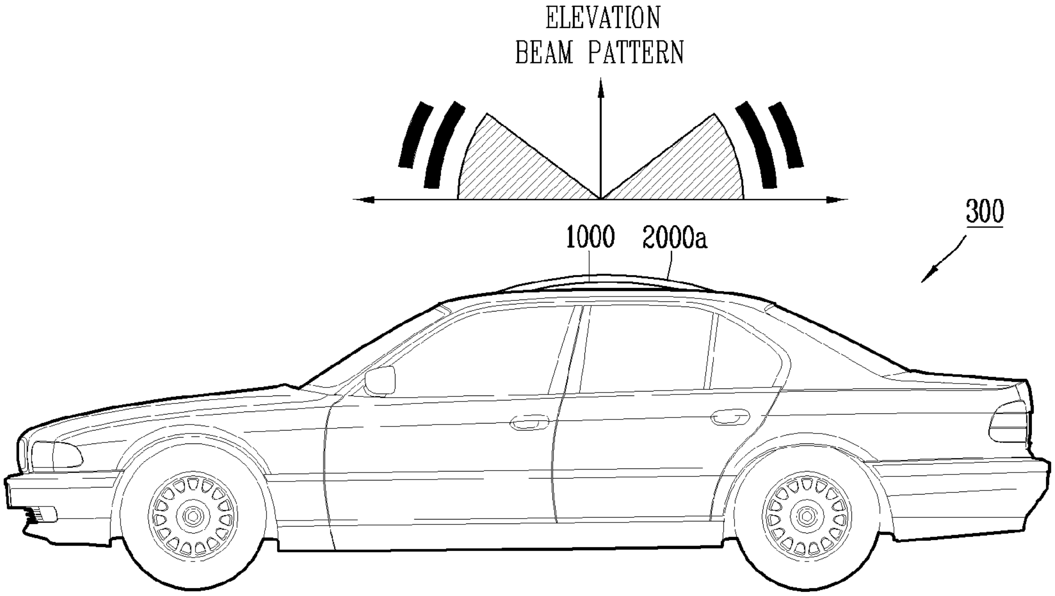
FIGS. 2A to 2C are views illustrating an example of a structure for mounting an antenna system on a vehicle, which includes the antenna system mounted on the vehicle.
Figure 2B:
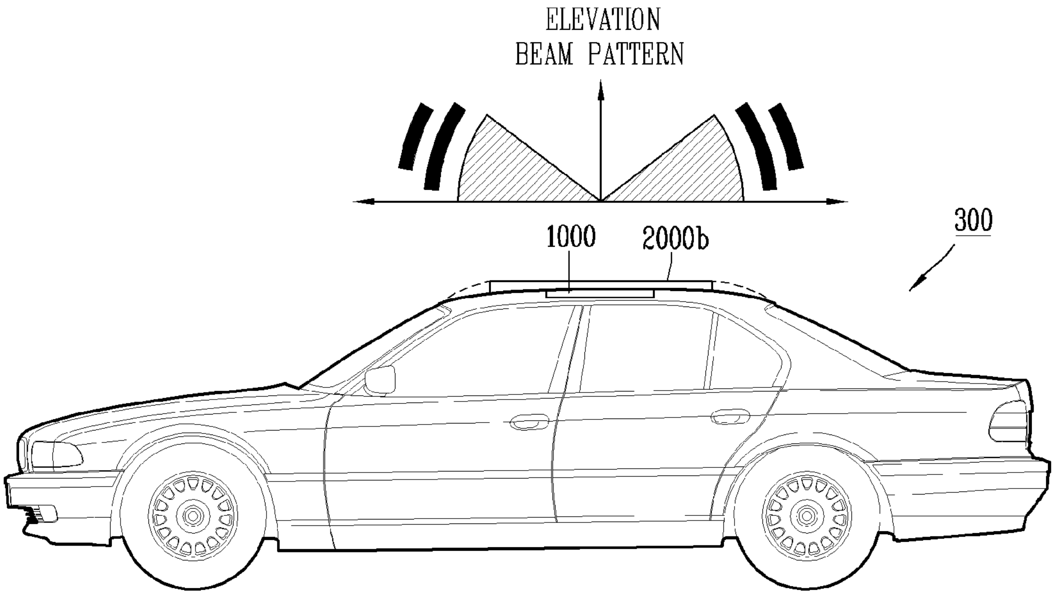
Figure 2C:
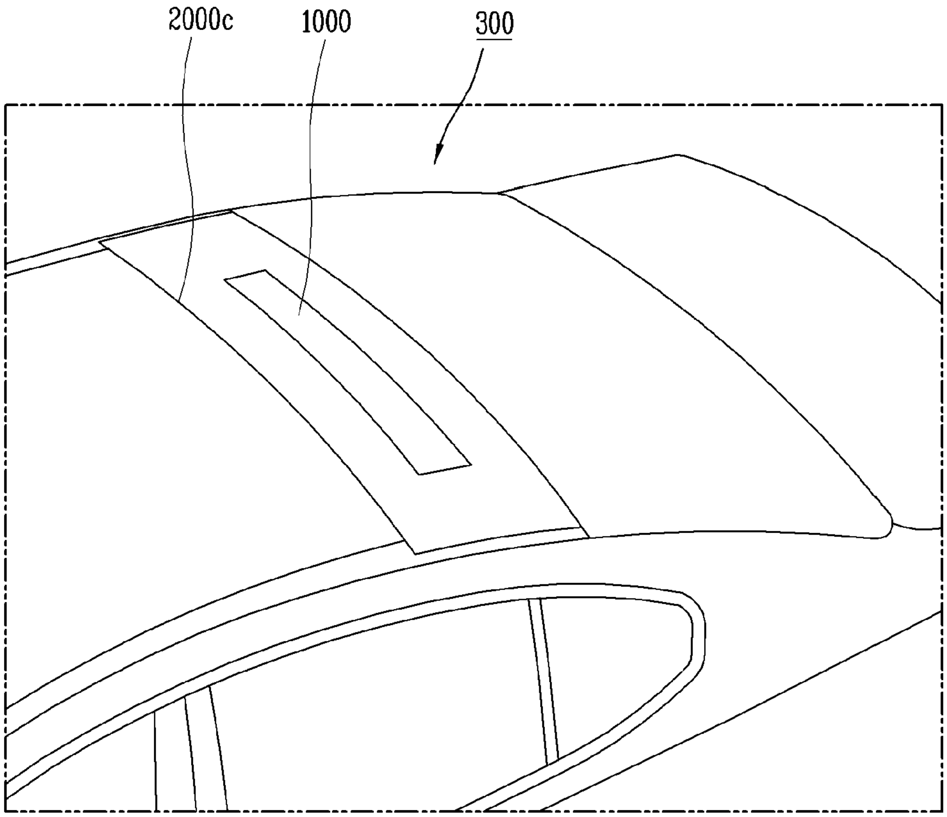

FIGS. 2A to 2C are views illustrating an example of a structure for mounting an antenna system on a vehicle, which includes the antenna system mounted on the vehicle. In this regard, FIGS. 2A and 2B illustrate a configuration in which an antenna system 1000 is mounted on or in a roof of a vehicle. Meanwhile, FIG. 2C illustrates a structure in which the antenna system 1000 is mounted on a roof of the vehicle and a roof frame of a rear mirror.

Referring to FIGS. 2A to 2C, in order to improve the appearance of the vehicle and to maintain a telematics performance at the time of collision, an existing shark fin antenna is replaced with a flat antenna of a non-protruding shape. In addition, the present disclosure proposes an integrated antenna of an LTE antenna and a 5G antenna considering fifth generation (5G) communication while providing the existing mobile communication service (e.g., LTE).

Referring to FIG. 2A, the antenna system 1000 may be disposed on the roof of the vehicle. In FIG. 2A, a radome 2000*a* for protecting the antenna system 1000 from an external environment and external impacts while the vehicle travels may cover the antenna system 1000. The radome 2000*a* may be made of a dielectric material through which radio signals are transmitted/received between the antenna system 1000 and a base station.

Referring to 2B, the antenna system 1000 may be disposed within a roof structure 2000*b* of the vehicle, and at least part of the roof structure 2000*b* may be made of a non-metallic material. At this time, the at least part of the roof structure 2000*b* of the vehicle may be realized as the non-metallic material, and may be made of a dielectric material through which radio signals are transmitted/received between the antenna system 1000 and the base station.

Also, referring to 2C, the antenna system 1000 may be disposed within a roof frame 2000*c* of the vehicle, and at least part of the roof frame 200*c* may be made of a non-metallic material. At this time, the at least part of the roof frame 2000*c* of the vehicle may be realized as the non-metallic material, and may be made of a dielectric material through which radio signals are transmitted/received between the antenna system 1000 and the base station.

Figure 3:
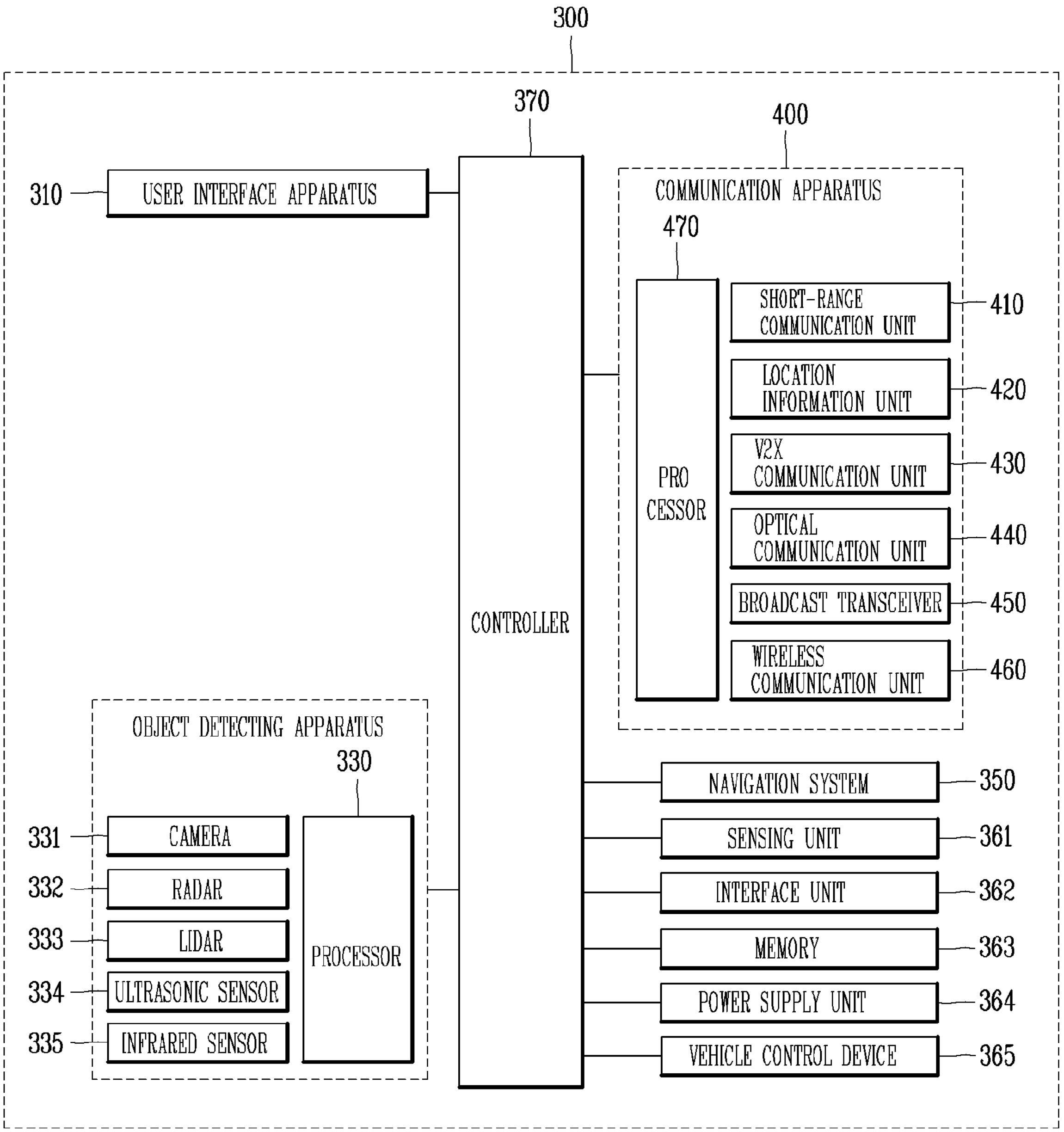
FIG. 3 is a block diagram illustrating a vehicle in accordance with an implementation.

Meanwhile, the antenna system 1000 may be installed on a front or rear surface of the vehicle depending on applications, other than the roof structure or roof frame of the vehicle. FIG. 3 is a block diagram illustrating a vehicle in accordance with an implementation of the present disclosure.

As illustrated in FIG. 2A to 3, a vehicle 300 may include wheels turning by a driving force, and a steering apparatus for adjusting a driving (ongoing, moving) direction of the vehicle 300.

The vehicle 300 may be an autonomous vehicle. The vehicle 300 may be switched into an autonomous (driving) mode or a manual (driving) mode based on a user input. For example, the vehicle 300 may be switched from the manual mode into the autonomous mode or from the autonomous mode into the manual mode based on a user input received through a user interface apparatus 310.

The vehicle 300 may be switched into the autonomous mode or the manual mode based on driving environment information. The driving environment information may be generated based on object information provided from an object detecting apparatus 320. For example, the vehicle 300 may be switched from the manual mode into the autonomous mode or from the autonomous mode into the manual mode based on driving environment information generated in the object detecting apparatus 320.

In an example, the vehicle 300 may be switched from the manual mode into the autonomous mode or from the autonomous mode into the manual mode based on driving environment information received through a communication apparatus 400. The vehicle 300 may be switched from the manual mode into the autonomous mode or from the autonomous mode into the manual mode based on information, data or signal provided from an external device.

When the vehicle 300 is driven in the autonomous mode, the autonomous vehicle 300 may be driven based on an operation system. For example, the autonomous vehicle 300 may be driven based on information, data or signal generated in a driving system, a parking exit system, and a parking system.

When the vehicle 300 is driven in the manual mode, the autonomous vehicle 300 may receive a user input for driving through a driving control apparatus. The vehicle 300 may be driven based on the user input received through the driving control apparatus.

An overall length refers to a length from a front end to a rear end of the vehicle 300, a width refers to a width of the vehicle 300, and a height refers to a length from a bottom of a wheel to a roof. In the following description, an overall-length direction L may refer to a direction which is a criterion for measuring the overall length of the vehicle 300, a width direction W may refer to a direction that is a criterion for measuring a width of the vehicle 300, and a height direction H may refer to a direction that is a criterion for measuring a height of the vehicle 300.

As illustrated in FIG. 3, the vehicle 300 may include a user interface apparatus 310, an object detecting apparatus 320, a navigation system 350, and a communication device 400. In addition, the vehicle may further include a sensing unit 361, an interface unit 362, a memory 363, a power supply unit 364, and a vehicle control device 365 in addition to the aforementioned apparatuses and devices. Here, the sensing unit 361, the interface unit 362, the memory 363, the power supply unit 364, and the vehicle control device 365 may have low direct relevance to wireless communication through the antenna system 1000 according to the present disclosure. So, a detailed description thereof will be omitted herein.

According to implementations, the vehicle 300 may include more components in addition to components to be explained in this specification or may not include some of those components to be explained in this specification.

The user interface apparatus 310 may be an apparatus for communication between the vehicle 300 and a user. The user interface apparatus 310 may receive a user input and provide information generated in the vehicle 300 to the user. The vehicle 300 may implement user interfaces (UIs) or user experiences (UXs) through the user interface apparatus 200.

The object detecting apparatus 320 may be an apparatus for detecting an object located at outside of the vehicle 300. The object may be a variety of objects associated with driving (operation) of the vehicle 300. In some examples, objects may be classified into moving objects and fixed (stationary) objects. For example, the moving objects may include other vehicles and pedestrians. The fixed objects may include traffic signals, roads, and structures, for example.

The object detecting apparatus 320 may include a camera 321, a radar 322, a LiDAR 323, an ultrasonic sensor 324, an infrared sensor 325, and a processor 330.

According to an implementation, the object detecting apparatus 320 may further include other components in addition to the components described, or may not include some of the components described.

The processor 330 may control an overall operation of each unit of the object detecting apparatus 320. The processor 330 may detect an object based on an acquired image, and track the object. The processor 330 may execute operations, such as a calculation of a distance from the object, a calculation of a relative speed with the object and the like, through an image processing algorithm.

The processor 330 may detect an object based on a reflected electromagnetic wave which an emitted electromagnetic wave is reflected from the object, and track the object. The processor 330 may execute operations, such as a calculation of a distance from the object, a calculation of a relative speed with the object and the like, based on the electromagnetic wave.

The processor 330 may detect an object based on a reflected laser beam which an emitted laser beam is reflected from the object, and track the object. The processor 330 may execute operations, such as a calculation of a distance from the object, a calculation of a relative speed with the object and the like, based on the laser beam.

The processor 330 may detect an object based on a reflected ultrasonic wave which an emitted ultrasonic wave is reflected from the object, and track the object. The processor 330 may execute operations, such as a calculation of a distance from the object, a calculation of a relative speed with the object and the like, based on the ultrasonic wave.

The processor 330 may detect an object based on reflected infrared light which emitted infrared light is reflected from the object, and track the object. The processor 330 may execute operations, such as a calculation of a distance from the object, a calculation of a relative speed with the object and the like, based on the infrared light.

According to an embodiment, the object detecting apparatus 320 may include a plurality of processors 330 or may not include any processor 330. For example, each of the camera 321, the radar 322, the LiDAR 323, the ultrasonic sensor 324 and the infrared sensor 325 may include the processor in an individual manner.

When the processor 330 is not included in the object detecting apparatus 320, the object detecting apparatus 320 may operate according to the control of a processor of an apparatus within the vehicle 300 or the controller 370.

The navigation system 350 may provide location information related to the vehicle based on information obtained through the communication apparatus 400, in particular, a location information unit 420. Also, the navigation system 350 may provide a path (or route) guidance service to a destination based on current location information related to the vehicle. In addition, the navigation system 350 may provide guidance information related to surroundings of the vehicle based on information obtained through the object detecting apparatus 320 and/or a V2X communication unit 430. In some examples, guidance information, autonomous driving service, etc. may be provided based on V2V, V2I, and V2X information obtained through a wireless communication unit operating together with the antenna system 1000.

The object detecting apparatus 320 may operate according to the control of a controller 370.

The communication apparatus 400 may be an apparatus for performing communication with an external device. Here, the external device may be another vehicle, a mobile terminal, or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an implementation, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 300 and at least one external device.

The location information unit 420 may be a unit for acquiring location information related to the vehicle 300. For example, the location information unit 420 may include a Global Positioning System (GPS) module or a Differential Global Positioning System (DGPS) module.

The V2X communication unit 430 may be a unit for performing wireless communication with a server (Vehicle to Infrastructure; V2I), another vehicle (Vehicle to Vehicle; V2V), or a pedestrian (Vehicle to Pedestrian; V2P). The V2X communication unit 430 may include an RF circuit implementing communication protocols such as V2I, V2V, and V2P.

The optical communication unit 440 may be a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an implementation, the light-emitting diode may be integrated with lamps provided on the vehicle 300.

The broadcast transceiver 450 may be a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal, and a data broadcast signal.

The wireless communication unit 460 is a unit that performs wireless communications with one or more communication systems through one or more antenna systems. The wireless communication unit 460 may transmit and/or receive a signal to and/or from a device in a first communication system through a first antenna system. In addition, the wireless communication unit 460 may transmit and/or receive a signal to and/or from a device in a second communication system through a second antenna system. For example, the first communication system and the second communication system may be an LTE communication system and a 5G communication system, respectively. However, the first communication system and the second communication system may not be limited thereto, and may be changed according to applications.

According to the present disclosure, the antenna system 1000 operating in the first and second communication systems may be disposed on the roof, in the roof or in the roof frame of the vehicle 300 according to one of FIGS. 2A to 2C. Meanwhile, the wireless communication unit 460 of FIG. 3 may operate in both the first and second communication systems, and may be combined with the antenna system 1000 to provide multiple communication services to the vehicle 300.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 300 or the controller 370.

Meanwhile, the communication apparatus 400 may implement a display apparatus for a vehicle together with the user interface apparatus 310. In this instance, the display apparatus for the vehicle may be referred to as a telematics apparatus or an Audio Video Navigation (AVN) apparatus.

The communication apparatus 400 may operate according to the control of the controller 370.

At least one processor and the controller 370 included in the vehicle 300 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

The vehicle 300 related to the present disclosure can operate in any one of a manual driving mode and an autonomous driving mode. That is, the driving modes of the vehicle 300 may include the manual driving mode and the autonomous driving mode.

Hereinafter, description will be given of implementations of a multi-transceiving system structure and an electronic device or vehicle having the same with reference to the accompanying drawings. Specifically, implementations related to a broadband antenna operating in a heterogeneous radio system, and an electronic device and a vehicle having the same will be described. It will be apparent to those skilled in the art that the present disclosure may be embodied in other specific forms without departing from the idea or essential characteristics thereof.

Figure 4:
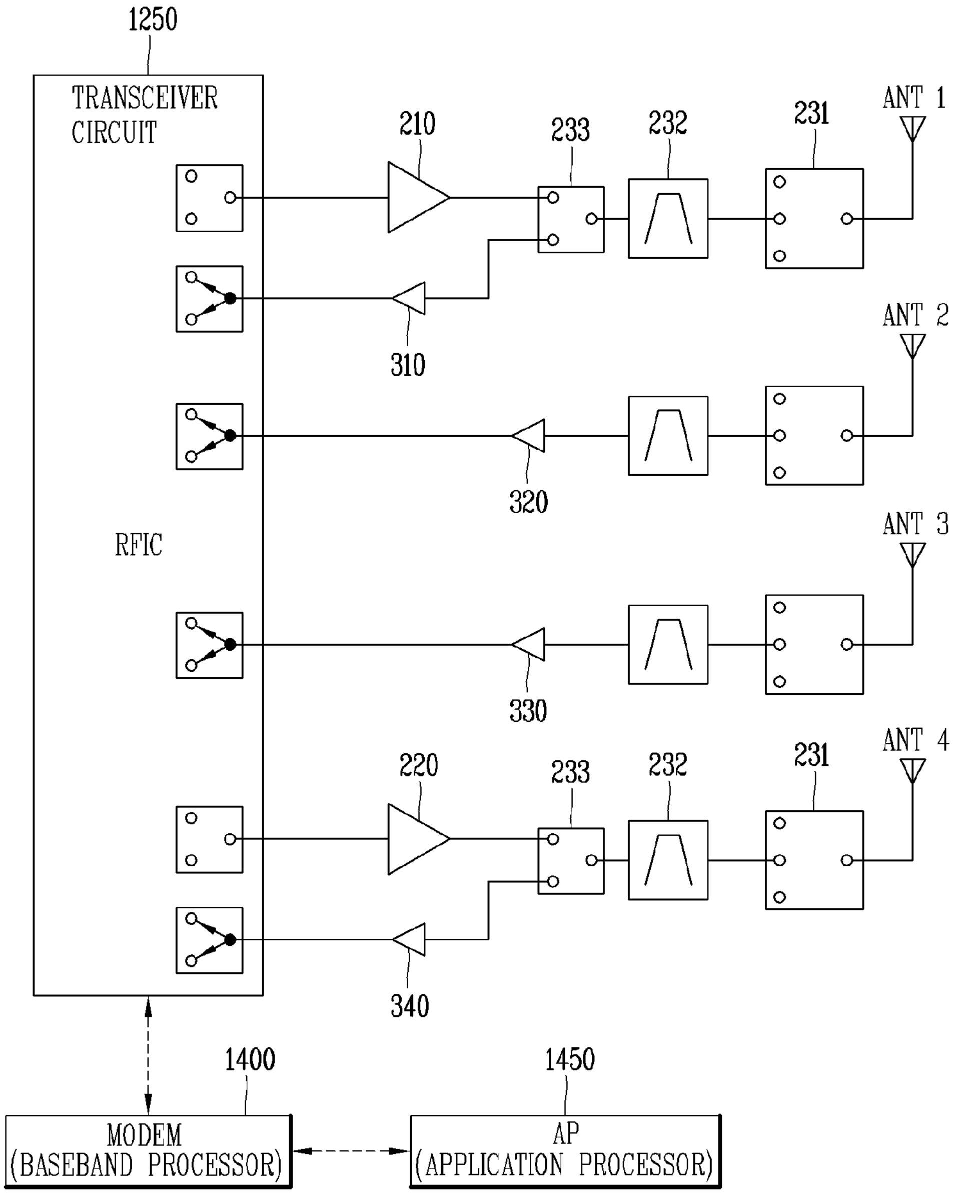
FIG. 4 is a block diagram illustrating a configuration of a wireless communication unit of an electronic device or vehicle operable in a plurality of wireless communication systems according to the present disclosure.

FIG. 4 is a block diagram illustrating a configuration of a wireless communication unit of an electronic device or vehicle operable in a plurality of wireless communication systems according to the present disclosure. Referring to FIG. 4, the electronic device or the vehicle may include a first power amplifier 210, a second power amplifier 220, and an RFIC 1250. In addition, the electronic device or the vehicle may further include a modem 1400 and an application processor (AP) 1450. Here, the modem 1400 and the application processor (AP) 1450 may be physically implemented on a single chip, and may be implemented in a logically and functionally separated form. However, the present disclosure may not be limited thereto and may be implemented in the form of a chip that is physically separated according to an application.

Meanwhile, the electronic device or the vehicle may include a plurality of low noise amplifiers (LNAs) 310 to 340 in the receiver. Here, the first power amplifier 210, the second power amplifier 220, the RFIC 1250, and the plurality of low noise amplifiers 310 to 340 may all be operable in the first communication system and the second communication system. In this case, the first communication system and the second communication system may be a 4G communication system and a 5G communication system, respectively.

As illustrated in FIG. 2, the RFIC 1250 may be configured as a 4G/5G integrated type, but the present disclosure may not be limited thereto. The RFIC 250 may be configured as a 4G/5G separate type according to an application. When the RFIC 1250 is configured as the 4G/5G integrated type, it may be advantageous in terms of synchronization between 4G and 5G circuits, and simplification of control signaling by the modem 1400.

On the other hand, when the RFIC 1250 is configured as the 4G/5G separate type, it may be referred to as a 4G RFIC and a 5G RFIC, respectively. In particular, when there is a great band difference between the 5G band and the 4G band, such as when the 5G band is configured as a millimeter wave band, the RFIC 1250 may be configured as a 4G/5G separated type. As such, when the RFIC 1250 is configured as the 4G/5G separate type, there may be an advantage that the RF characteristics can be optimized for each of the 4G band and the 5G band.

Meanwhile, even when the RFIC 1250 is configured as the 4G/5G separate type, the 4G RFIC and the 5G RFIC may be logically and functionally separated but physically implemented in one chip.

On the other hand, the application processor (AP) 1450 may be configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate power circuits of a transmitter and a receiver through the RFIC 1250 in a low power mode.

In this regard, when it is determined that the electronic device is in an idle mode, the application processor (AP) 1450 may control the RFIC 1250 through the modem 400 as follows. For example, when the electronic device is in an idle mode, the application processor 1450 may control the RFIC 1250 through the modem 1400, such that at least one of the first and second power amplifiers 210 and 220 operates in a low power mode or is turned off.

According to another implementation, the application processor (AP) 1450 may control the modem 1400 to enable wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, even though a throughput is slightly sacrificed, the application processor (AP) 1450 may control the modem 1400 and the RFIC 1250 to perform short-range communication using only the short-range communication module 113.

According to another implementation, when a remaining battery capacity of the electronic device is equal to or greater than a threshold value, the application processor 1450 may control the modem 1400 to select an optimal wireless interface. For example, the application processor (AP) 1450 may control the modem 1400 to receive data through both the 4G base station and the 5G base station according to the remaining battery capacity and the available radio resource information. In this case, the application processor (AP) 1450 may receive the remaining battery capacity information from the PMIC and the available radio resource information from the modem 1400. Accordingly, when the remaining battery capacity and the available radio resources are sufficient, the application processor (AP) 1450 may control the modem 1400 and the RFIC 1250 to receive data through both the 4G base station and 5G base station.

Meanwhile, in a multi-transceiving system of FIG. 4, a transmitter and a receiver of each radio system may be integrated into a single transceiver. Accordingly, a circuit portion for integrating two types of system signals may be removed from an RF front-end.

Furthermore, since the front end parts can be controlled by an integrated transceiver, the front end parts may be more efficiently integrated than when the transceiving system is separated by communication systems.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 210 and the second power amplifier 220 may operate in at least one of the first and second communication systems. In this regard, when the 5G communication system operates in a 4G band or a Sub 6 band, the first and second power amplifiers 1210 and 220 can operate in both the first and second communication systems.

On the other hand, when the 5G communication system operates in a millimeter wave (mmWave) band, one of the first and second power amplifiers 210 and 220 may operate in the 4G band and the other in the millimeter-wave band.

On the other hand, two different wireless communication systems may be implemented in one antenna by integrating a transceiver and a receiver to implement a two-way antenna. In this case, 4×4 MIMO may be implemented using four antennas as illustrated in FIG. 2. At this time, 4×4 DL MIMO may be performed through downlink (DL).

Meanwhile, when the 5G band is a Sub 6 band, first to fourth antennas ANT1 to ANT4 may be configured to operate in both the 4G band and the 5G band. On the contrary, when the 5G band is a millimeter wave (mmWave) band, the first to fourth antennas ANT1 to ANT4 may be configured to operate in one of the 4G band and the 5G band. In this case, when the 5G band is the millimeter wave (mmWave) band, each of the plurality of antennas may be configured as an array antenna in the millimeter wave band.

Meanwhile, 2×2 MIMO may be implemented using two antennas connected to the first power amplifier 210 and the second power amplifier 220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented by 1 Tx, only one of the first and second power amplifiers 210 and 220 need to operate in the 5G band. Meanwhile, when the 5G communication system is implemented by 4 Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 1250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller.

In addition, the electronic device or the vehicle capable of operating in a plurality of wireless communication systems according to an implementation may further include a duplexer 231, a filter 232, and a switch 233.

The duplexer 231 may be configured to separate a signal in a transmission band and a signal in a reception band from each other. In this case, the signal in the transmission band transmitted through the first and second power amplifiers 210 and 220 may be applied to the antennas ANT1 and ANT4 through a first output port of the duplexer 231. On the contrary, the signal in the reception band received through the antennas ANT1 and ANT4 may be received by the low noise amplifiers 310 and 340 through a second output port of the duplexer 231.

The filter 232 may be configured to pass a signal in a transmission band or a reception band and to block a signal in a remaining band. In this case, the filter 232 may include a transmission filter connected to the first output port of the duplexer 231 and a reception filter connected to the second output port of the duplexer 231. Alternatively, the filter 232 may be configured to pass only the signal in the transmission band or only the signal in the reception band according to a control signal.

The switch 233 may be configured to transmit only one of a transmission signal and a reception signal. In an implementation of the present disclosure, the switch 233 may be configured in a single-pole double-throw (SPDT) form to separate the transmission signal and the reception signal in a time division duplex (TDD) scheme. In this case, the transmission signal and the reception signal may be in the same frequency band, and thus the duplexer 231 may be implemented in a form of a circulator.

Meanwhile, in another implementation of the present disclosure, the switch 233 may also be applied to a frequency division multiplex (FDD) scheme. In this case, the switch 233 may be configured in the form of a double-pole double-throw (DPDT) to connect or block a transmission signal and a reception signal, respectively. On the other hand, since the transmission signal and the reception signal can be separated by the duplexer 231, the switch 233 may not be necessarily required.

Meanwhile, the electronic device or the vehicle according to the present disclosure may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit.

The modem 1400 may perform controlling of signal transmission and reception and processing of signals through different communication systems using the RFID 1250. The modem 1400 may acquire control information from a 4G base station and/or a 5G base station. Here, the control information may be received through a physical downlink control channel (PDCCH), but may not be limited thereto.

The modem 1400 may control the RFIC 1250 to transmit and/or receive signals through the first communication system and/or the second communication system for a specific time interval and from frequency resources. Accordingly, the RFIC 1250 may control transmission circuits including the first and second power amplifiers 210 and 220 to transmit a 4G signal or a 5G signal in the specific time interval. In addition, the RFIC 1250 may control reception circuits including the first to fourth low noise amplifiers 310 to 340 to receive a 4G signal or a 5G signal in the specific time interval.

Hereinafter, the antenna system that is mounted in the vehicle and includes the plurality of antennas and the vehicle having the antenna system according to FIGS. 2 to 4 will be described. In this regard, FIG. 5A is a view illustrating radiation patterns for different types of antennas applicable to a vehicle antenna system.

Figure 5A:
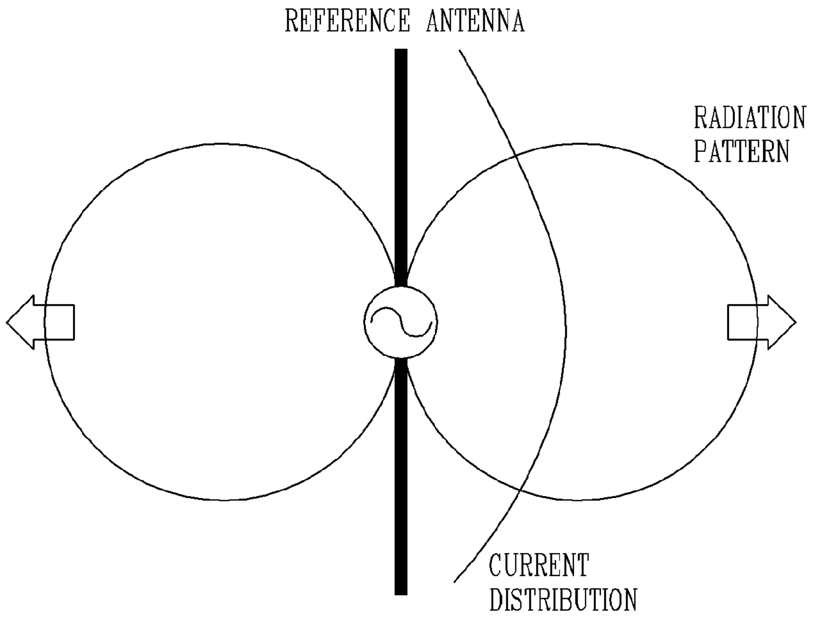
FIG. 5A is a view illustrating radiation patterns for different types of antennas applicable to a vehicle antenna system.
Figure 5A:
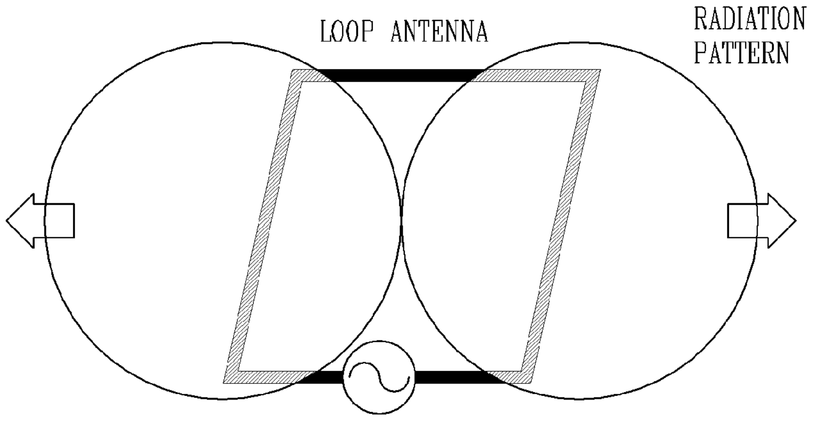
Figure 5B:
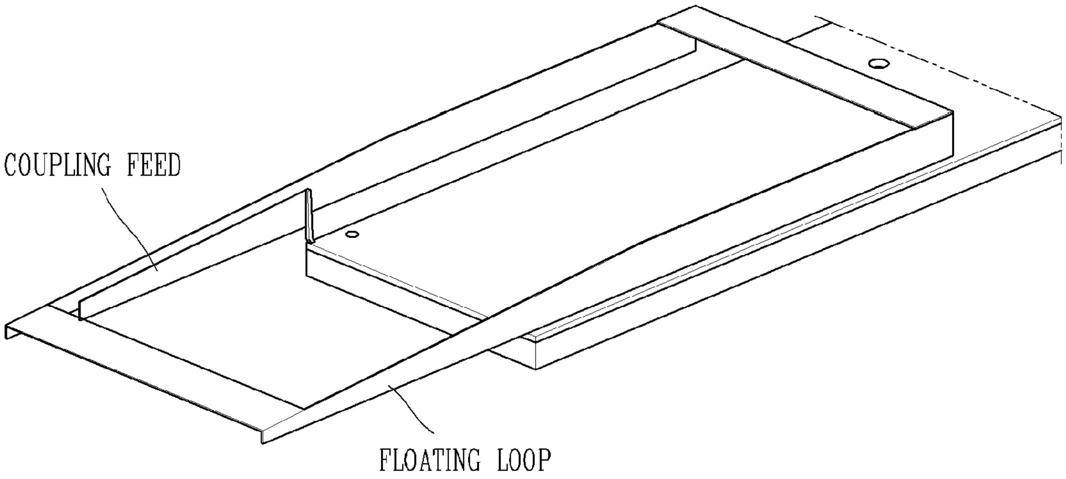
FIG. 5B is a view illustrating an antenna structure having a coupling feed and a floating feed according to one example.
Figure 6A:
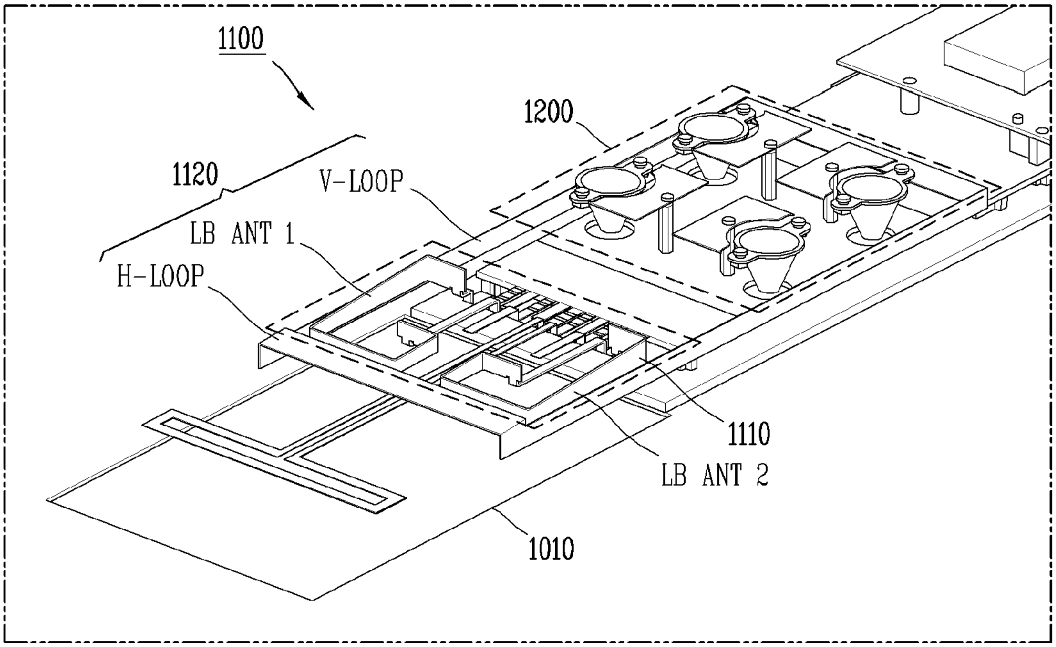
FIG. 6A is a view illustrating a first antenna corresponding to a low band (LB) antenna and a second antenna corresponding to a middle band (MB) and high band (HB) antenna in an antenna system that can be disposed inside a vehicle according to one example.
Figure 6B:
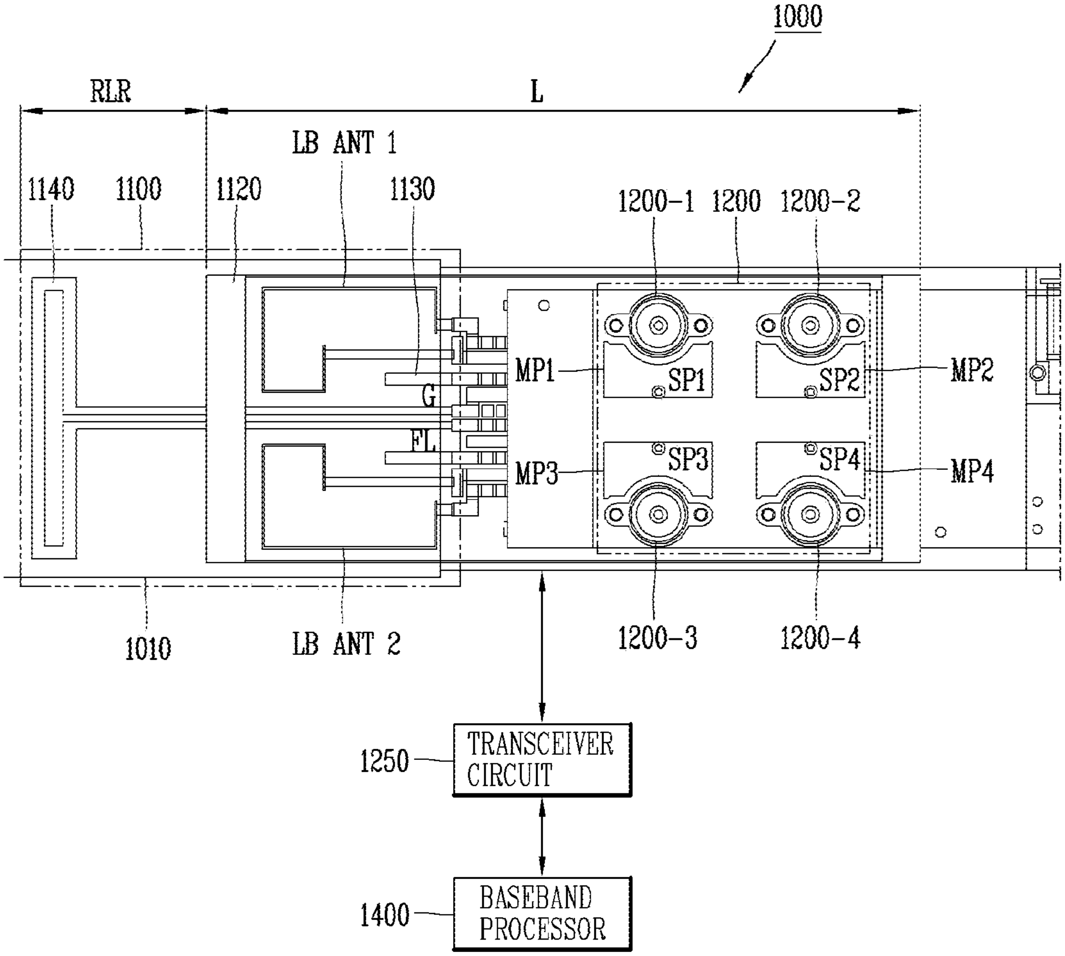
FIG. 6B is a view illustrating a configuration of a plurality of antennas and a configuration for controlling the plurality of antennas in an antenna system that can be disposed inside a vehicle according to an example.

FIG. 5B is a view illustrating an antenna structure having a coupling feed and a floating feed according to one example. Also, FIG. 6A is a view illustrating a first antenna corresponding to a low band (LB) antenna and a second antenna corresponding to a middle band (MB) and high band (HB) antenna in an antenna system that can be disposed inside a vehicle according to one example. FIG. 6B is a view illustrating a configuration of a plurality of antennas and a configuration for controlling the plurality of antennas in an antenna system that can be disposed inside a vehicle according to an example.

Referring to (a) of FIG. 5A, a reference antenna may be a dipole antenna. A current distribution formed in the dipole antenna may be in the form of a sine wave. Accordingly, a radiation pattern of the dipole antenna may have an end-fire shape formed on both sides of the dipole antenna. On the other hand, an antenna element having the end-fire type radiation pattern, such as the dipole antenna, can operate in a wide frequency band, compared to an antenna element having a bore site type radiation pattern such as a patch antenna.

Referring to (b) of FIG. 5A, a radiation pattern of a loop antenna like the dipole antenna may also have an end-fire shape formed on both sides of the antenna. An antenna element having the end-fire type radiation pattern, such as the loop antenna, can operate in a wide frequency band, compared to an antenna element having the bore site-type radiation pattern such as the patch antenna.

On the other hand, requirements for a vehicle antenna system according to the present disclosure may be as follows.

Vehicle antenna requirements: An average gain (Mean gain) is −2 dBi at a low elevation, i.e., 70 to 90 degrees of elevation. That is, the mean gain corresponding to horizontal radiation performance in an almost horizontal direction that corresponds to the low elevation is −2 dB.

Limitations of the related art: With an antenna technology using an inner space of a module, it is difficult to satisfy antenna performance requirements due to performance degradation caused by a low antenna height.

Necessity of the present disclosure: An antenna structure is required to improve antenna performance without an additional increase in height to secure antenna performance.

This may bring up the low band (LB) antenna issue as follows. In an on-ground environment of the vehicle and a design space with an antenna height of 17 mm or less, a beam peak is formed vertically, so it is difficult to satisfy low elevation performance. In this regard, a shark antenna having a low elevation characteristic at 1 GHz or less may be located in an outer region of the vehicle. On the other hand, a vehicle antenna to be implemented in the present disclosure needs to be implemented to have a low height of 17 mm or less. To this end, a loop antenna structure as illustrated in (b) of FIG. 5A may be introduced. Accordingly, when the loop antenna is applied, it may have a differentiating point that the loop antenna does not protrude to an outer region of a roof of the vehicle.

Therefore, in the present disclosure, the low elevation performance can be satisfied by implementing an LB antenna in the form of a dipole antenna or a loop antenna. In this regard, a loop antenna that corresponds to an equivalent model to a dipole antenna and is implemented with a low height may be considered. That is, it may be necessary to apply an operating principle of a loop antenna that is an equivalent model to a dipole antenna, has a low height, and has the same or similar radiation pattern to the dipole antenna.

Referring to FIGS. 5B to 6B, the first antenna 1100 which is an LB antenna may include a first LB antenna LB ANT1 and a second LB antenna LB ANT2. The first antenna 1110 may include a plurality of conductive members and may be configured to operate as a radiator in a first frequency band.

Meanwhile, the first LB antenna LB ANT1 may include a plurality of conductive members, and implement a closed loop with one end connected to a feeding line and another end connected to the ground. In addition, the second LB antenna LB ANT2 may include a plurality of conductive members, and implement a closed loop with one end connected to a second feeding line and another end connected to the ground.

Specifically, the first antenna 1100 may include a plurality of conductive members 1110 and a loop antenna (floating loop) 1120. The loop antenna 1120 may be configured in a loop shape to surround the plurality of conductive members 1110 so that signals from the plurality of conductive members 1110 are coupled.

On the other hand, the second antenna 1200 may be disposed adjacent to the first antenna 1100 in the antenna system. In this regard, the first antenna 1100, which is the LB antenna, may be disposed on one side of the antenna system. The second antenna 1200, which is an antenna for a middle band (MB) and a high band (HB), may be disposed on a side surface of the antenna system. Meanwhile, another LB antenna may be disposed on another side of the antenna system.

Here, the first antenna 1100 may operate in a band including 650 MHz to 900 MHz or 600 MHz to 960 MHz, which is the low band LB. However, the low band LB may not be limited thereto and may vary depending on applications. The second antenna 1200 may operate in the middle band MB starting from 1400 MHz and the high band HB which is a higher frequency band than the middle band MB.

The second antenna 1200 may be disposed in the antenna system separately from the first antenna 1100 and configured to operate in a second frequency band higher than the first frequency band. Another type of LB antenna (not illustrated) may be disposed in a space between the first antenna 1100 and the second antenna 1200. As an example, another type of LB antenna may be another type of LB antenna in the form of a metal plate. On the other hand, the second antenna 1200 may include four cone antennas 1200-1 to 1200-4.

The transceiver circuit 1250 may be controlled to radiate a signal through at least one of the first antenna 1100 and the second antenna 1200. Here, the transceiver circuit 1250 may be a radio frequency integrated chip (RFIC) including a power amplifier and a low noise amplifier.

Also, a baseband processor 1400 may be connected to the transceiver circuit 1250 to control the transceiver circuit 1250. The baseband processor 1400 may control the transceiver circuit 1250 to perform MIMO through the first antennas LB ANT1 and LB ANT2 in the first frequency band. Also, the baseband processor 1400 may control the transceiver circuit 1250 to perform MIMO through the plurality of cone antennas 1200-1 to 1200-4 corresponding to the second antenna 1200 in the second frequency band.

When quality of a signal received through the first antenna 1100 is lower than or equal to a threshold, the baseband processor 1400 may control the signal to be radiated through the second antenna 1200. To this end, the baseband processor 1400 may control the transceiver circuit 1250 to perform MIMO through the second antenna 1200 in the second frequency band.

In one example, the loop antenna 1120 may include a coupling feed and a floating loop. Meanwhile, the loop antenna 1120 may include a vertical loop antenna V-loop and a horizontal loop antenna H-loop. In this regard, a plurality of conductive members 1110 of the first antenna 1100 may be referred to as source antennas or driven patterns. In this case, some of the plurality of conductive members 1110 may be referred to as coupling feeds. On the other hand, the loop antenna 1120 of the first antenna 1100 may be referred to as a floating loop.

The vertical loop antenna V-loop may surround a region where the first antenna 1100 and the second antenna 1200 are disposed, and may be substantially perpendicular to the lower substrate 1010. Also, the horizontal loop antenna H-loop may be connected to the vertical loop antenna V-loop and disposed substantially parallel to the lower substrate 1010. The horizontal loop antenna H-loop may be disposed between ends of the plurality of conductive members 1100 and a radiation loop region (RLR) of a remote keyless entry (RKE) antenna 1140.

In detail, the vertical loop antenna V-loop and the plurality of conductive members 1110 may be disposed substantially parallel to each other. Accordingly, signals from the plurality of conductive members 1110 can be effectively coupled to the vertical loop antenna V-loop.

Meanwhile, a height of the vertical loop antenna V-loop may be higher than a height of the plurality of conductive members 1110. Accordingly, the first antenna 1100 can operate as a broadband antenna by the plurality of conductive members 1110 and the vertical loop antenna V-loop. Also, the vertical loop antenna V-loop can be disposed at a higher height in a wider region than the plurality of conductive members 1110, and thus the low elevation characteristic can be improved. That is, signal reception performance of the first frequency band in the horizontal direction in which the antenna system is mounted, that is, the low elevation characteristic can be improved.

Meanwhile, the plurality of conductive members 1110 may be disposed substantially perpendicular to the lower substrate 1010. In addition, in order to improve isolation between the first LB antenna LB ANT1 and the second LB antenna LB ANT2, an arrangement shape of the first LB antenna LB ANT1 and an arrangement shape of the second LB antenna LB ANT2 may be different from each other. In this regard, the first LB antenna LB ANT1 and the second LB antenna LB ANT2 may be configured to have a vertical symmetric form with respect to a center line of the antenna system.

Meanwhile, the first LB antenna LB ANT1 and the second LB antenna LB ANT2 may also be configured as a loop type. In this regard, in order to reduce interference between the first LB antenna LB ANT1 and the second LB antenna LB ANT2, each feeder may be disposed adjacent to each outer loop. In this case, each feeder may be disposed at a point offset inward from the outer loop in order to match impedance and reduce interference with the loop antenna 1120.

In another example, in order to reduce interference between the first LB antenna LB ANT1 and the second LB antenna LB ANT2, each feeder may be disposed at a point offset outward from each inner loop.

Meanwhile, a first Wireless Local Area Network (WLAN) antenna and a second WLAN antenna 1130 may be disposed between the spaces in which the first LB antenna LB ANT1 and the second LB antenna LB ANT2 are disposed, respectively. Accordingly, the antenna system may further include the first WLAN antenna and the second WLAN antenna 1130. The first WLAN antenna and the second WLAN antenna 1130 may be disposed between the first LB antenna and the second LB antenna, and may include conductive members disposed parallel to the lower substrate 1010.

In addition, the antenna system may further include a Remote Keyless Entry (RKE) antenna 1140 disposed between the first WLAN antenna and the second WLAN antenna. In this regard, one end of the RKE antenna 1140 may be connected to a feeding line and another end may be connected to the ground so as to implement a closed loop. In this case, a radiation loop region (RLR) defined by the RKE antenna 1140 may be located closer to a boundary region of the antenna system than to a region where the loop antenna 1120 is disposed. This can improve reception performance in a region closer to the vehicle than to the first antenna 1110.

Meanwhile, as aforementioned, the second antenna 1200 may include the plurality of cone antennas 1200-1 to 1200-4. The second antenna 1200 may include a plurality of cone radiators, metal patches (MP1-MP4), and shorting pins (SP1-SP4).

Specifically, the metal patches (MP1-MP4) may be disposed at the plurality of cone radiators, respectively, with being spaced apart from one another by predetermined distances so as to be coupled to signals from upper apertures of the cone radiators. Meanwhile, each of the shorting pin-pins (SP1-SP4) may be configured to connect the a metal patch to the ground of the lower substrate 1010.

In one example, the metal patch and the shorting pin may be disposed in a vertical symmetrical shape with respect to a cone radiator disposed on an upper portion and another cone radiator disposed on a lower portion. This can reduce interference between the plurality of cone radiators. Referring to FIGS. 6A and 6B, the plurality of cone antennas 1200-1 to 1200-4 may be disposed in a vertical symmetrical form. That is, the first cone antenna 1200-1 and the third cone antenna 1200-3 may be disposed in a vertical symmetrical form, that is, rotated by 180 degrees with respect to each other. Also, the second cone antenna 1200-2 and the fourth cone antenna 1200-4 may be disposed in a vertical symmetrical form, that is, rotated by 180 degrees with respect to each other.

On the other hand, the arrangement structure among the plurality of cone antennas 1200-1 to 1200-4 and the shape of the metal patch may optimally vary depending on applications. In this regard, a plurality of outer rims that are integrally formed with the cone radiators to connect the cone radiators of the plurality of cone antennas 1200-1 to 1200-4 with the upper substrate may be disposed at intervals of about 120 degrees. Accordingly, the metal patches (MP1-MP4) disposed adjacent to the cone radiators may be disposed adjacent to the cone radiators to be optimized for the structure of the outer rims disposed at the intervals of 120 degrees.

Therefore, the first cone antenna 1200-1 and the second cone antenna 1200-2 may be arranged in different forms in order to minimize interference therebetween. On the other hand, the first cone antenna 1200-1 and the third cone antenna 1200-3 may be disposed in a vertical symmetrical form, that is, rotated by 180 degrees with respect to each other. Also, the second cone antenna 1200-2 and the fourth cone antenna 1200-4 may be disposed in a vertical symmetrical form, that is, rotated by 180 degrees with respect to each other.

Meanwhile, the loop antenna 1120 of the first antenna 1100 may be disposed higher than a position where the plurality of cone radiators constituting the second antenna 1200 are disposed. Specifically, the vertical loop antenna V-loop may be disposed higher than a position where the plurality of cone radiators constituting the second antenna 1200 are disposed. This can improve the signal reception performance of the first frequency band in the horizontal direction in which the antenna system is mounted, that is, the low elevation characteristic. In addition, since the vertical loop antenna V-loop is disposed at an outer side of the plurality of cone antennas 1200-1 to 1200-4, interference with the second antenna in the second frequency band can be maintained to be equal to or lower than a threshold.

As aforementioned, the second antenna 1200 may include a plurality of cone antennas 1200-1 to 1200-4 each including a cone radiator and a patch antenna. The transceiver circuit 1250 may be controlled to radiate a signal through at least one of the first antenna 1100 and the second antenna 1200. Here, the transceiver circuit 1250 may be a radio frequency integrated chip (RFIC) including a power amplifier and a low noise amplifier.

The baseband processor 1400 may be connected to the transceiver circuit 1250 to control the transceiver circuit 1250. The baseband processor 1400 may perform MIMO through the plurality of cone antennas 1200-1 to 1200-4.

The baseband processor 1400 may control the transceiver circuit 1250 to perform MIMO through the first antennas LB ANT1 and LB ANT2 in the first frequency band. Also, the baseband processor 1400 may control the transceiver circuit 1250 to perform MIMO through the plurality of cone antennas 1200-1 to 1200-4 corresponding to the second antenna 1200 in the second frequency band.

In one example, the baseband processor 1400 may perform MIMO in the first frequency band through the first antenna 1100 and at least one of the plurality of cone antennas 1200-1 to 1200-4. Therefore, the antenna system can perform MIMO in the low band LB through different types of antennas, thereby reducing interference between MIMO streams. In this regard, a distance between antennas for performing MIMO may be set to be at least 5 times of an operating frequency.

However, the interference between MIMO streams can be reduced even by the distance between adjacent antennas through different types of antennas, that is, the first antenna including the conductive members and the coupling loop and the second antenna including the cone radiators.

In another example, the baseband processor 1400 may be configured to perform carrier aggregation (CA). In this regard, the first antenna 1100 may operate as a radiator in the low band LB that is the first frequency band, and the second antenna 1200 may operate as a radiator in the second frequency band that is higher than the first frequency band.

Therefore, the baseband processor 1400 may control the transceiver circuit 1250 to receive a first signal of the first frequency band through the first antenna 1100 and a second signal of the second frequency band through the second antenna 1200. Also, the baseband processor 1400 may control the transceiver circuit 1250 to transmit the first signal of the first frequency band through the first antenna 1100 and the second signal of the second frequency band through the second antenna 1200. Accordingly, the baseband processor 1400 can control the transceiver circuit 1250 to perform carrier aggregation (CA).

Figure 7:
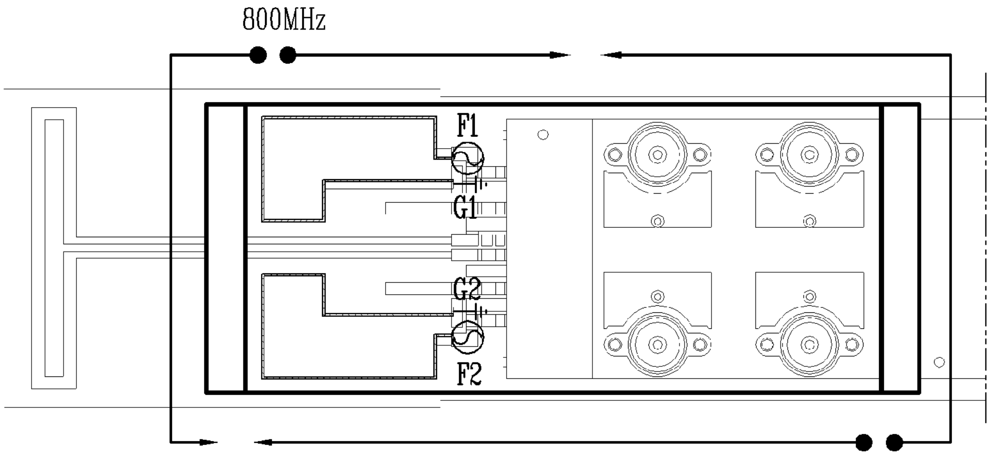
FIG. 7 is a conceptual diagram illustrating an operating principle of a loop antenna configured to surround a first antenna and a second antenna according to one implementation.
Figure 7:
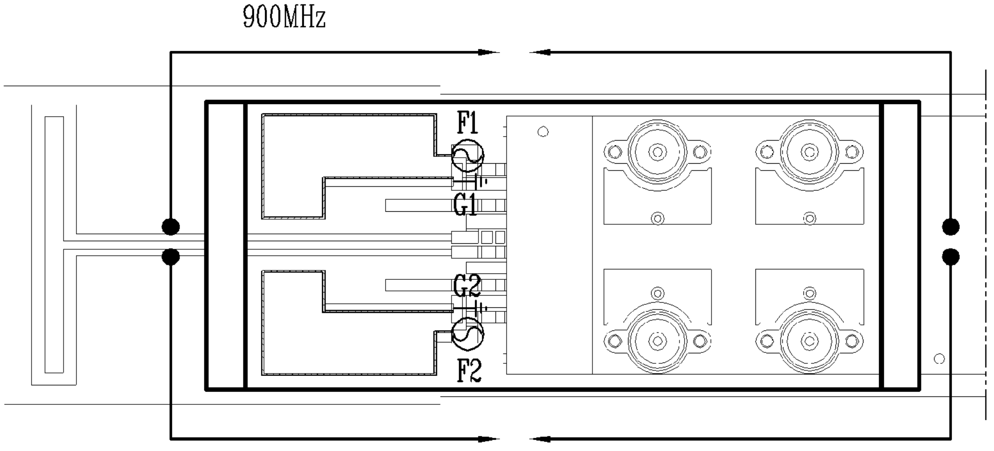
Figure 7:
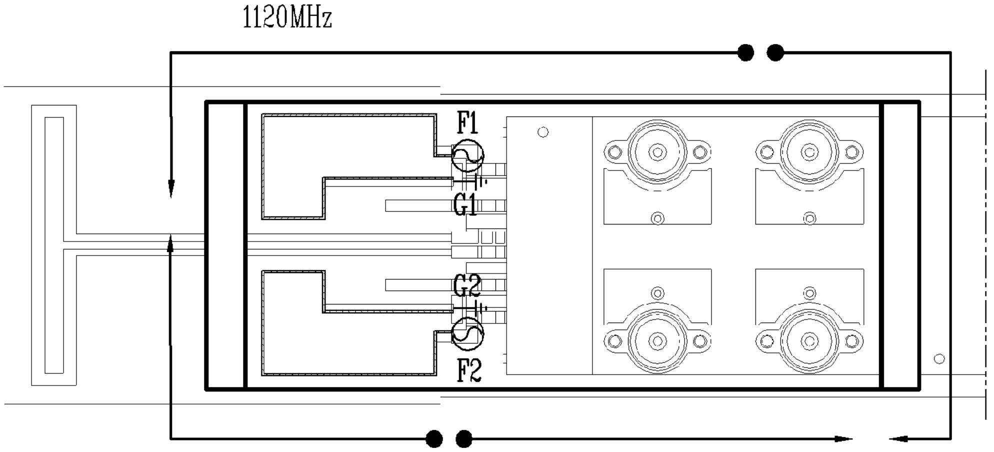

The foregoing description has been given of the antenna system mounted in the vehicle. The first antenna 1100 may include the plurality of conductive members 1110 and the loop antenna 1120. Hereinafter, the operating principle of the loop antenna, which is the LB antenna, will be described. FIG. 7 is a conceptual diagram illustrating an operating principle of a loop antenna configured to surround a first antenna and a second antenna according to one implementation.

Referring to FIGS. 6A and 6B, and (a) to (c) of FIG. 7, the loop antenna 1120 may operate at 800 MHz, 900 MHz, and 1120 MHz, which belongs to the low band LB.

The first LB antenna LB ANT1 and the second LB antenna LB ANT2 may be configured as loop antennas. In this regard, in order to reduce interference between the first LB antenna LB ANT1 and the second LB antenna LB ANT2, feeders F1 and F2 may be disposed adjacent to outer loops, respectively. Each of the feeders F1 and F2 may be disposed at a point offset inward from the outer loop in order to match impedance and reduce interference with the loop antenna 1120. Accordingly, ground portions G1 and G2 of the first LB antenna LB ANT1 and the second LB antenna LB ANT2 may also be disposed at points that are offset outward from inner loops, respectively.

However, the arrangement of the feeders F1 and F2 and the ground portions G1 and G2 of the first LB antenna LB ANT1 and the second LB antenna LB ANT2 may not be limited thereto. In another example, the feeders of the first LB antenna LB ANT1 and the second LB antenna LB ANT2 may also be disposed at points that are offset outward from the inner loops, respectively. Therefore, the ground portions of the first LB antenna LB ANT1 and the second LB antenna LB ANT2 may also be disposed at points that are offset inward from the outer loops, respectively.

On the other hand, when coupling from the plurality of conductive members 1110 to the loop antenna 1120 is made, a current distribution of the loop antenna 1120 may have periodicity as illustrated in (a) to (c) of FIG. 7. Accordingly, the antenna characteristics of the first antenna 1100 can be improved even in the low band LB according to a length of the loop antenna 1120 other than lengths of the first LB antenna LB ANT1 and the second LB antenna LB ANT2.

Figure 8A:
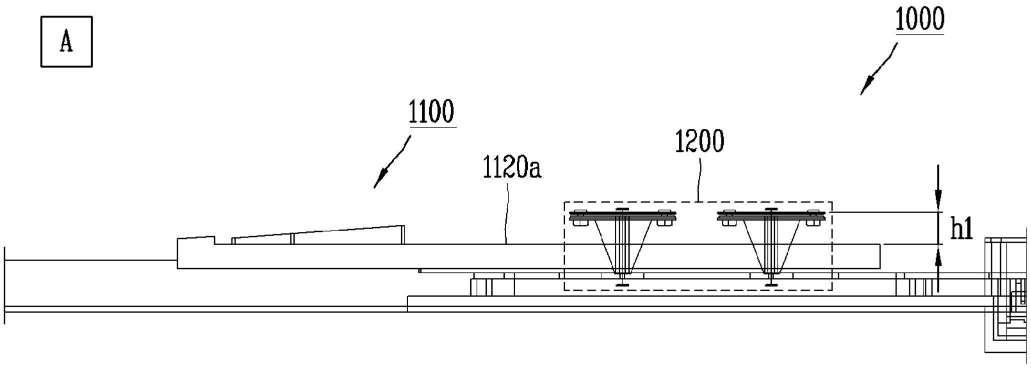
FIGS. 8A and 8B are lateral views illustrating an antenna system including a first antenna and a second antenna including loop antennas of various shapes.
Figure 8B:
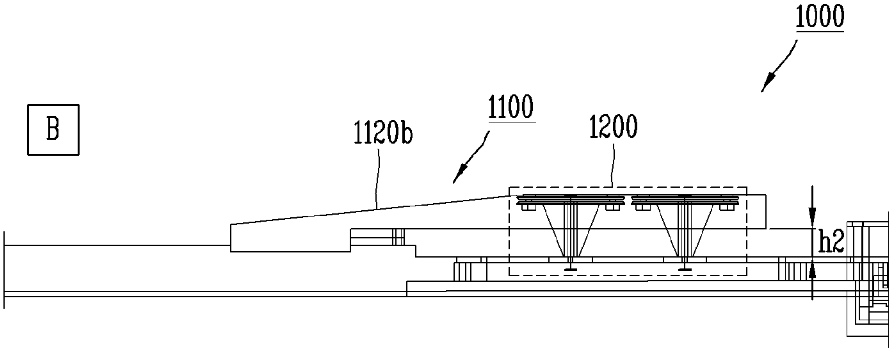

FIGS. 8A and 8B are lateral views illustrating an antenna system including a first antenna and a second antenna including loop antennas of various shapes. FIG. 8A illustrates a structure in which the loop antenna 1120*a* is formed to have a height lower than that of the second antenna 1200. In this regard, the loop antenna 1120*a* may be disposed at a position, which is lower than a top of the second antenna 1200 by h1. This can lower an entire antenna height while improving LB antenna characteristic in the antenna system including the first antenna and the second antenna.

On the other hand, FIG. 8B illustrates a structure in which the loop antenna 1120*b* is formed to have a height higher than that of the second antenna 1200. In this regard, the loop antenna 1120*b* may be disposed at a position, which is higher than a top of the second antenna 1200 by a predetermined height. Also, the loop antenna 1120*b* may be spaced apart from the lower circuit board by h2. Accordingly, the low elevation reception characteristic of the loop antenna 1120*b* in the elevation direction can be improved. This can improve the low elevation reception characteristic as well as the LB antenna characteristic in the antenna system including the first antenna and the second antenna.

In this regard, referring to FIGS. 6A, 8A, and 8B, the vertical loop antenna V-loop and the plurality of conductive members 1110 may be disposed substantially parallel to each other. Accordingly, signals from the plurality of conductive members 1110 can be effectively coupled to the vertical loop antenna V-loop.

Meanwhile, a height of the vertical loop antenna V-loop may be higher than a height of the plurality of conductive members 1110. Accordingly, the first antenna 1100 can operate as a broadband antenna by the plurality of conductive members 1110 and the vertical loop antenna V-loop. Also, the vertical loop antenna V-loop can be disposed at a higher height in a wider region than the plurality of conductive members 1110, and thus the low elevation characteristic can be improved. That is, signal reception performance of the first frequency band in the horizontal direction in which the antenna system is mounted, that is, the low elevation characteristic can be improved.

Figure 9:
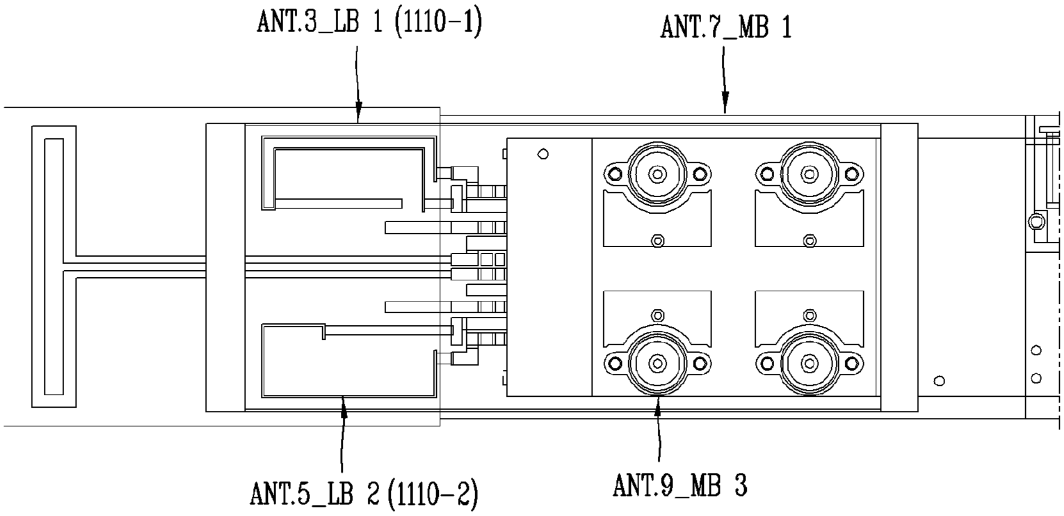
FIG. 9 is a view illustrating a structure of an antenna system including a first antenna and a second antenna according to one example.

Hereinafter, a description will be given of comparison results of antenna performance according to a pattern structure of a floating loop disclosed herein. FIG. 9 is a view illustrating a structure of an antenna system including a first antenna and a second antenna according to one example.

Figure 10:
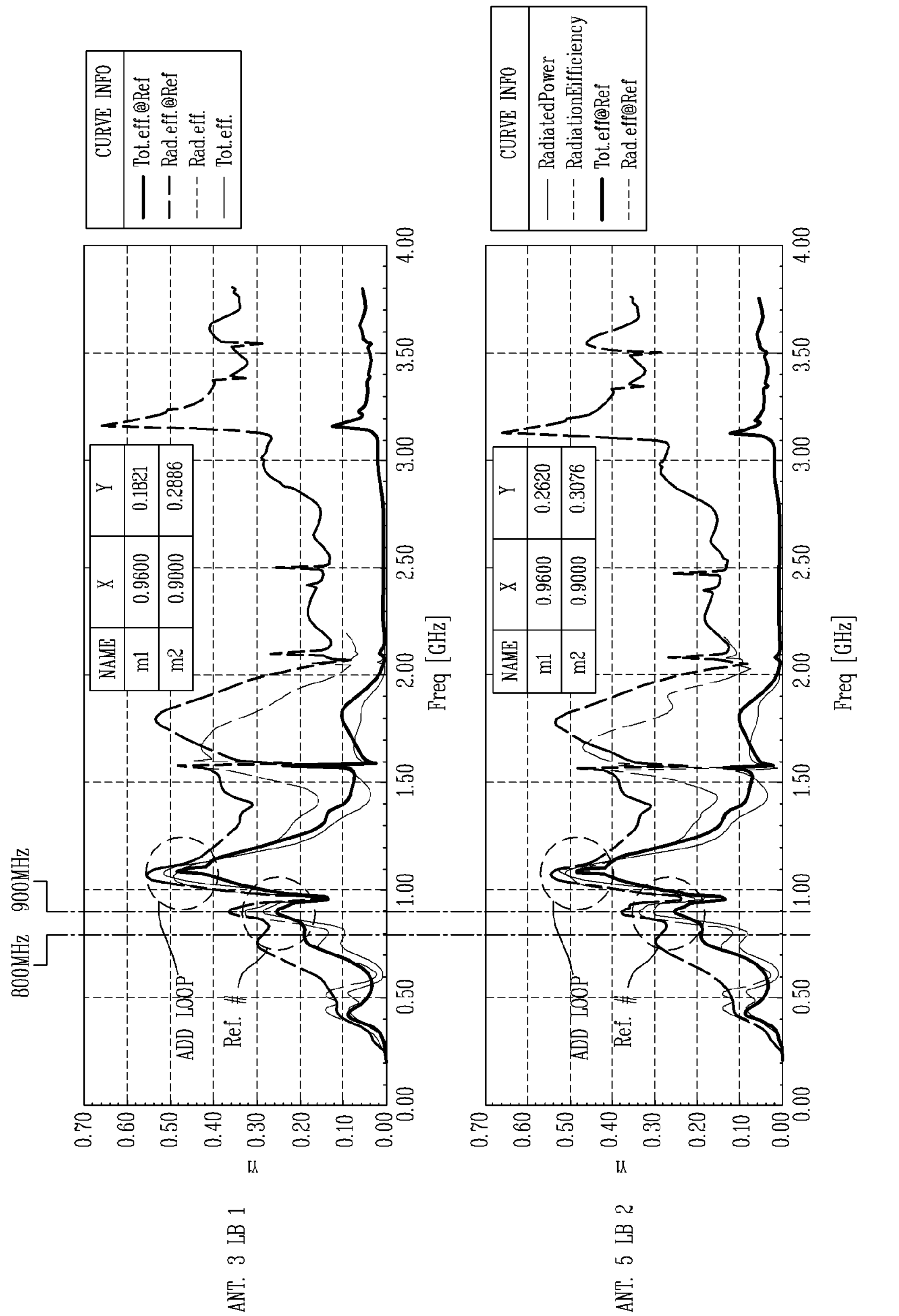
FIG. 10 is a view illustrating changes in characteristics of first and second LB antennas according to whether or not a loop antenna is added.
Figure 11A:
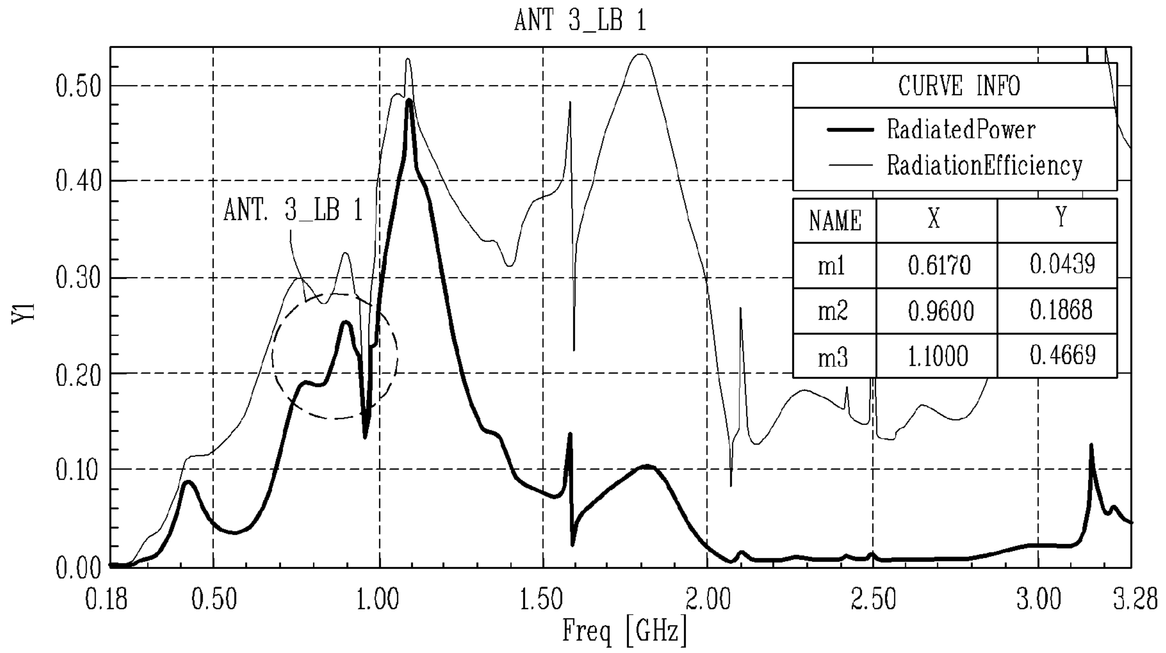
FIGS. 11A and 11B are views illustrating comparison results of characteristics of the first and second LB antennas in the antenna structure of FIGS. 8A and 8B.
Figure 11B:
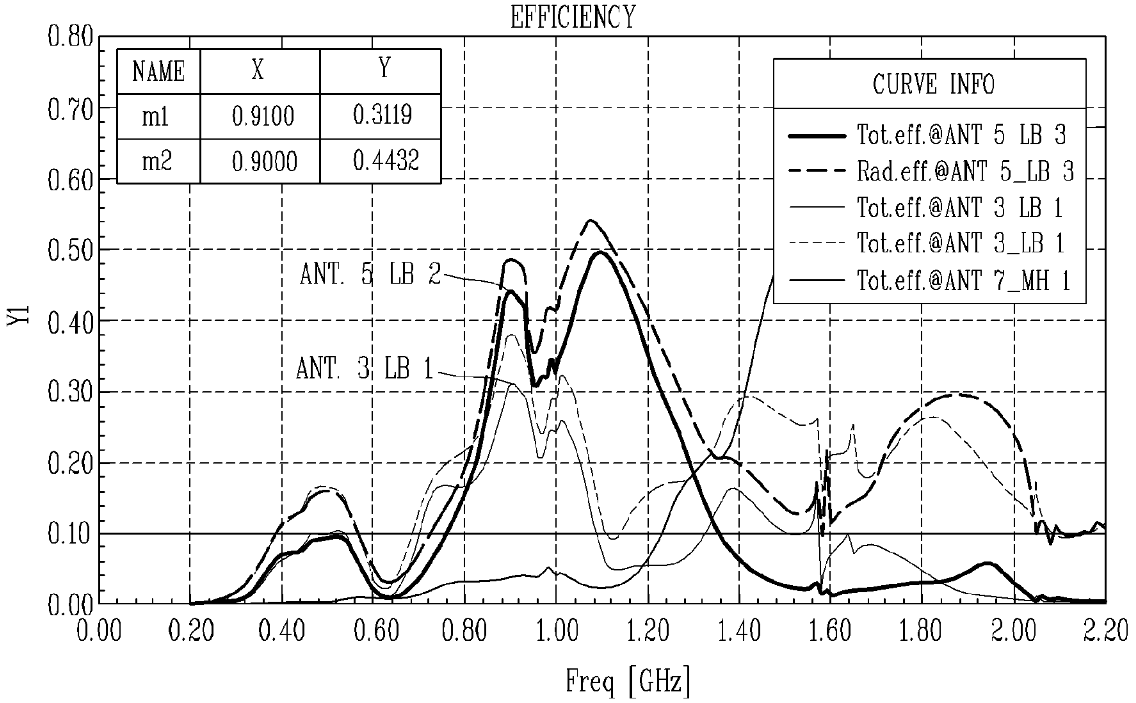
Figure 11C:
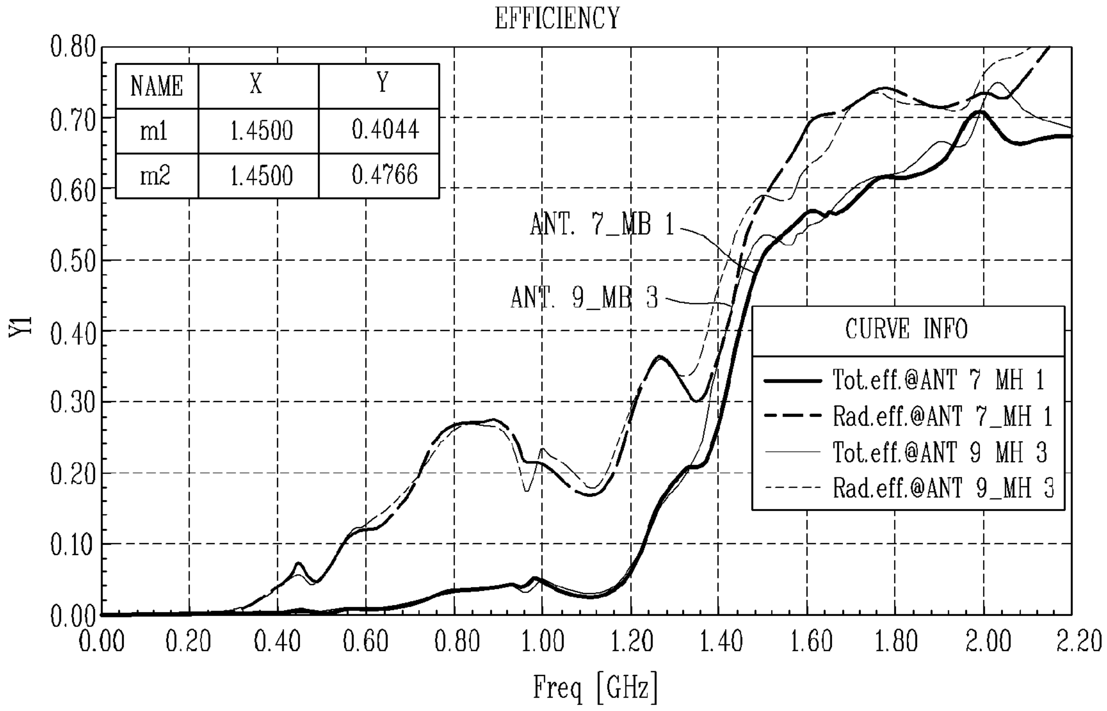
FIG. 11C is a view illustrating a comparison result of the characteristics of the second antenna in the antenna structure of FIG. 9.

FIG. 10 is a view illustrating changes in characteristics of first and second LB antennas according to whether or not a loop antenna is added. FIGS. 11A and 11B are views illustrating comparison results of characteristics of the first and second LB antennas in the antenna structure of FIGS. 8A and 8B. Also, FIG. 11C is a view illustrating a comparison result of the characteristics of the second antenna in the antenna structure of FIG. 9.

FIG. 9 illustrates a part of the antenna system mounted in the vehicle. Referring to FIGS. 6B and 9, the RKE antenna 1140 that is disposed in one side of the antenna system may be referred to as ANT1. Also, another RKE antenna that is disposed in one side of the antenna system may be referred to as ANT2. Accordingly, the first LB antenna and the second LB antenna may be referred to as ANT3_LB1 (1110-1) and ANT5_LB2 (1110-2). Meanwhile, another LB antennas may be disposed in another side of the antenna system, and these LB antennas may be referred to as ANT4 and ANT6.

Referring to FIG. 9, the first LB antenna ANT3_LB1 (1110-1) may have a structure in which a loop length is increased so that the loop antenna operates only in the low band LB. On the other hand, the second LB antenna ANT5_LB2 (1110-2) may have a structure which is designed such that the loop antenna can have optimized antenna characteristics in the low band LB.

In this regard, an inner loop and an outer loop of the first LB antenna ANT3_LB1 (1110-1) may be disposed adjacent to each other. In this case, a stub line may be connected to one point of the inner loop for impedance matching in the low band LB. On the other hand, an inner loop and an outer loop of the second LB antenna ANT5_LB2 (1110-2) may be disposed to be spaced apart from each other by a predetermined distance and connected through a connecting portion. In this case, a stub line may be connected to an end of the inner loop and then connected to a ground portion.

Meanwhile, referring to FIGS. 6B and 9, the first cone antenna 1200-1 may be referred to as ANT7_MB1. The third cone antenna 1200-3 disposed in the vertical symmetrical structure with the first cone antenna 1200-1 may be referred to as ANT9_MB3. In this regard, the second cone antenna 1200-2 may be referred to as ANT8_MB2, and the fourth cone antenna 1200-4 may be referred to as ANT10_MB4.

Referring to FIGS. 6B, 9, and 10, radiation efficiency of the first LB antenna ANT3_LB1 (1110-1) can be improved by the addition of the loop antenna 1120. Radiation efficiency of the second LB antennas ANT5_LB2 (1110-2) can also be improved by the addition of the loop antenna 1120.

Referring to FIGS. 6B, 9, 11A, and 11B, it can be seen that the radiation efficiency of the first LB antenna ANT3_LB1 (1110-1) is reduced in the middle band MB and the high band HB, compared to the low band LB. On the other hand, it can be seen that the radiation efficiency of the second LB antenna ANT5_LB2 (1110-2) is higher than that of the first LB antenna ANT3_LB1 (1110-1) in the low band LB. On the other hand, it can be seen that the radiation efficiency in the low band LB is increased as the height of the loop antenna 1120 is increased as illustrated in FIG. 9B.

In addition, it can be seen that the radiation efficiency of the second LB antenna ANT5_LB2 (1110-2) is maintained at a constant level even in the middle band MB in addition to the low band LB. Therefore, in order to reduce interference between the first antenna and the second antenna, the first antenna may be formed in the same structure as the first LB antenna ANT3_LB1 (1110-1). That is, the inner loop and the outer loop of the first LB antenna ANT3_LB1 (1110-1) may be disposed adjacent to each other. In this case, a stub line may be connected to one point of the inner loop for impedance matching in the low band LB.

Accordingly, when the first antenna and the second antenna are used simultaneously, the baseband processor 1400 may control the transceiver circuit 1250 to transmit and receive signals through the first LB antenna ANT3_LB1 (1110-1) and the second antenna 1200. This can reduce interference between the first antenna and the second antenna.

On the other hand, when only the first antenna is used, the baseband processor 1400 may control the transceiver circuit 1250 to transmit and receive signals through the second LB antenna ANT5_LB2 (1110-2). This can maximize radiation efficiency of the first antenna operating in the low band LB.

Meanwhile, referring to FIGS. 6B, 9, and 11C, the first cone antenna ANT7_MB1 (1200-1) and the second cone antenna ANT7_MB3 (1200-2) corresponding to the second antenna 1200 may have high efficiency in the middle band MB and high band HB.

Accordingly, as the second antenna 1200 operates in the middle band MB and the high band HB, the interference with the first antenna 1100 can be reduced. On the other hand, the radiation efficiency in the low band LB can be improved in a low band direction by increasing the size of the cone radiator or the patch antenna corresponding to the second antenna 1200. In this case, the first antenna 1100 may have the same structure as the first LB antenna ANT3_LB1 (1110-1), so that the interference with the second antenna 1200 can be reduced. In this regard, the inner loop and the outer loop of the first LB antenna ANT3_LB1 (1110-1) may be disposed adjacent to each other. In this case, the stub line may be connected to one point of the inner loop for impedance matching in the low band LB.

Figure 12A:
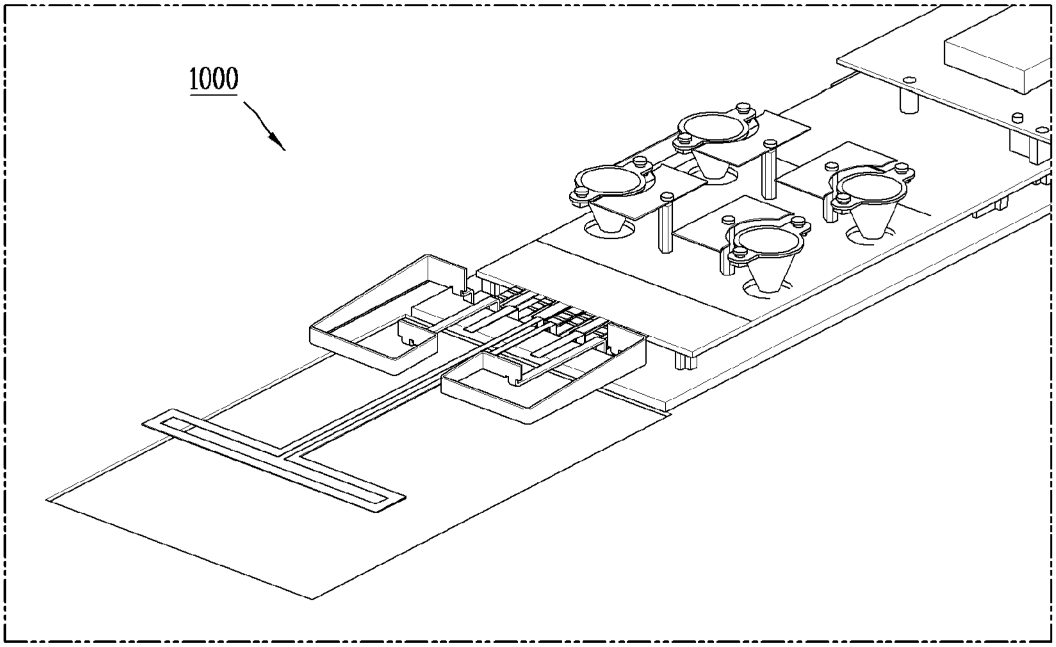
FIG. 12A is a view illustrating an antenna pattern radiated through a first antenna when there is no floating loop in an antenna system in which a plurality of antennas are disposed.
Figure 12A:
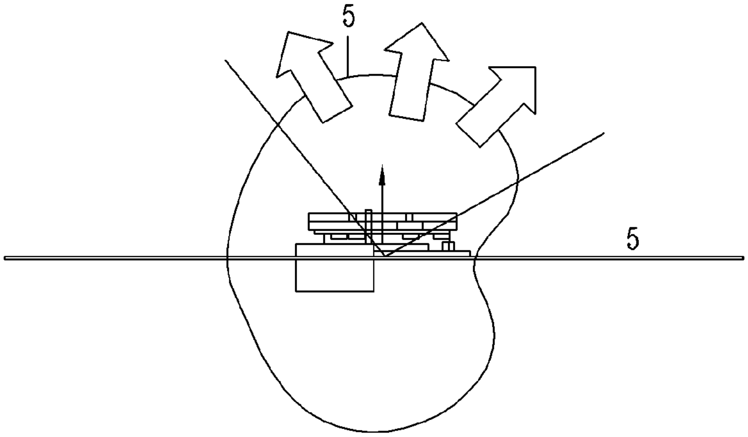
Figure 12B:
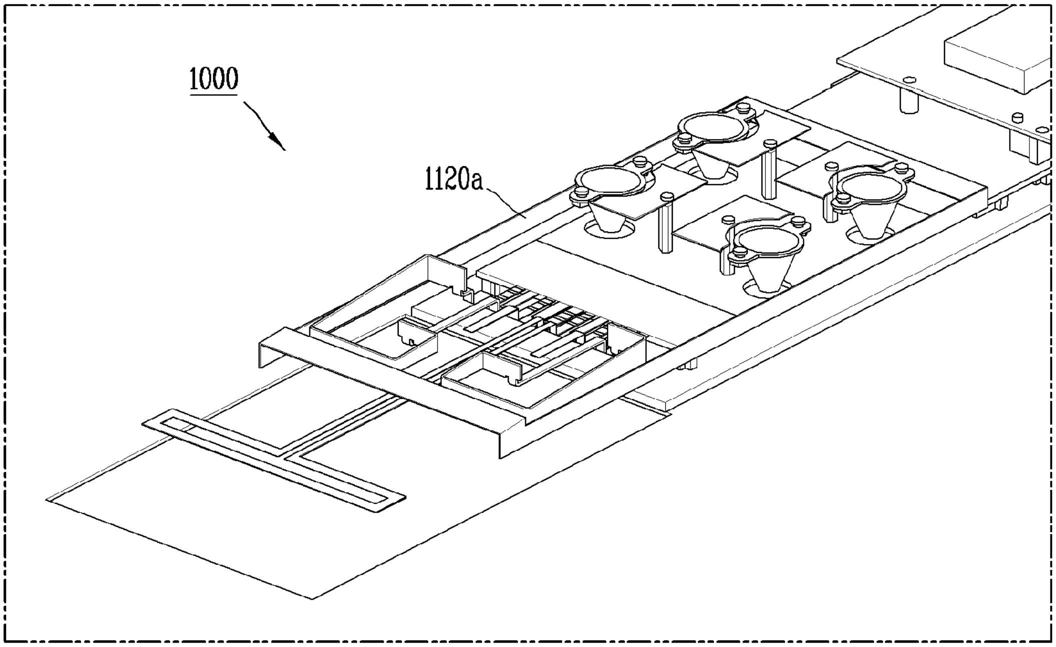
FIG. 12B is a view illustrating an antenna pattern radiated through a first antenna when there is a first type of floating loop in an antenna system in which a plurality of antennas are disposed.
Figure 12B:
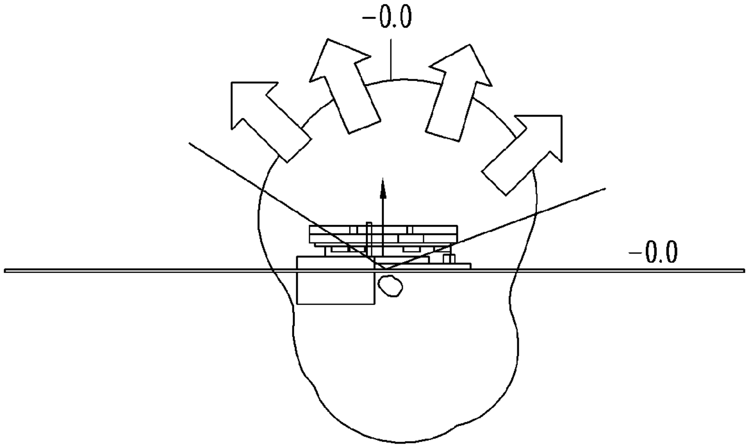
Figure 12C:
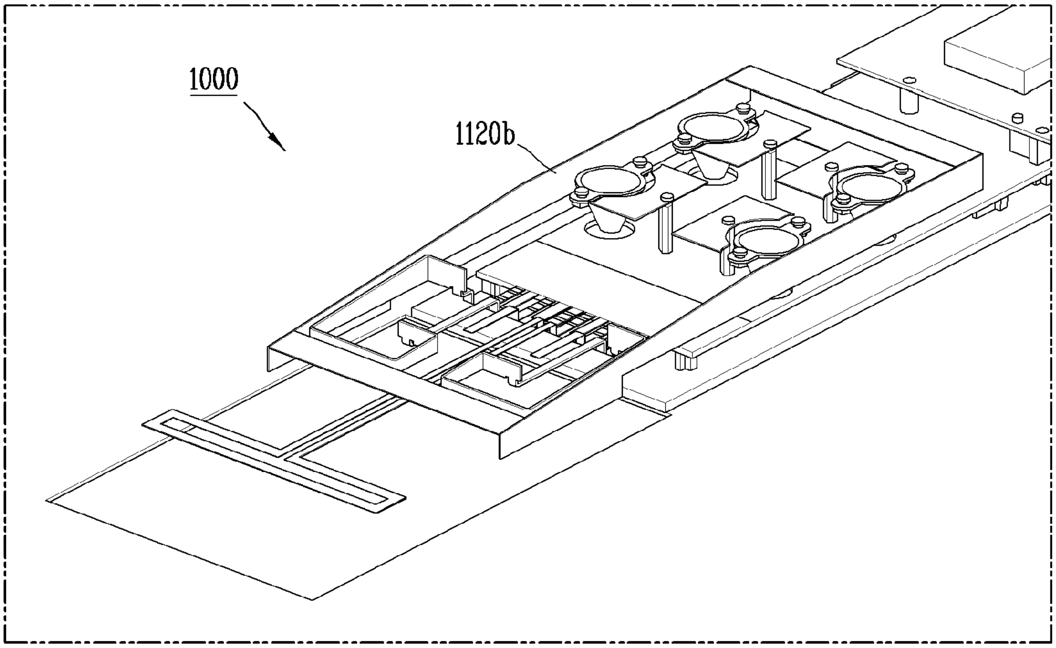
FIG. 12C is a view illustrating an antenna pattern radiated through a first antenna when there is a second type of floating loop in an antenna system in which a plurality of antennas are disposed.
Figure 12C:
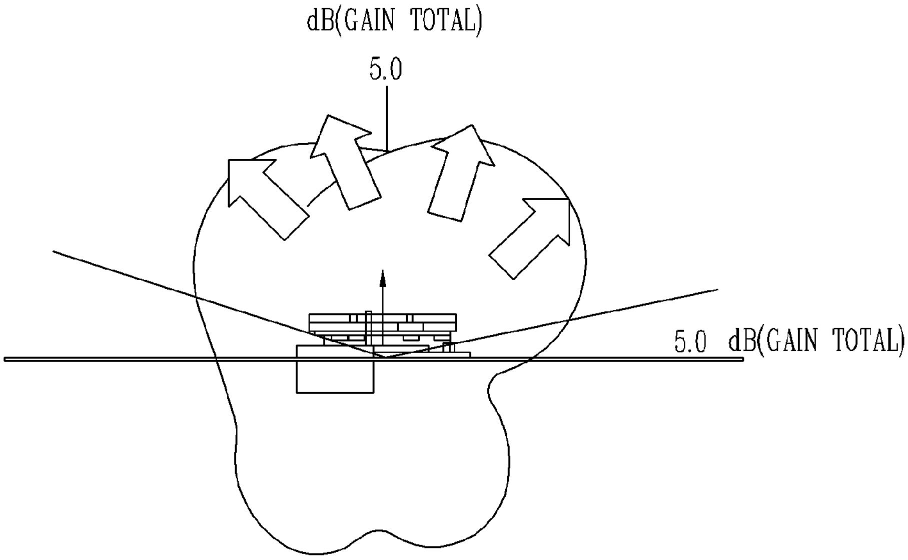

Hereinafter, a radiation pattern according to whether or not a floating loop is applied will be described. FIG. 12A is a view illustrating an antenna pattern radiated through a first antenna when there is no floating loop in an antenna system in which a plurality of antennas are disposed. FIG. 12B is a view illustrating an antenna pattern radiated through a first antenna when there is a first type of floating loop in an antenna system in which a plurality of antennas are disposed. FIG. 12C is a view illustrating an antenna pattern radiated through a first antenna when there is a second type of floating loop in an antenna system in which a plurality of antennas are disposed.

Referring to FIGS. 6B and 12A, when there is not a floating loop, the radiation pattern for the first antenna 1100 of the antenna system 100 may be mainly radiated in a direction of an upper bore site.

On the other hand, referring to FIGS. 6B, 8A and 12B, when the floating loop 1120*a* is disposed, the radiation pattern for the first antenna 1100 of the antenna system 100 may also be radiated in a low elevation direction in addition to the upper bore site direction. Accordingly, it can be seen that transmission and reception characteristics at the low elevation are improved as the floating loop 1120*a* is disposed. In this case, the height of the cone radiator 1200 of the second antenna 1200 may be set to be higher than that of the floating loop 1120*a* by h1. In one example, the height h1 by which the cone radiator 1200 is higher than the floating loop 1120*a* may be set to a value between about 7 mm and 8 mm. Specifically, the height h1 of the cone radiator may be set to be higher than the floating loop 1120*a* by about 7.7 mm. However, the height h1 may not be limited thereto and may vary depending on applications.

In addition, referring to FIGS. 6B, 8B, and 12C, when the floating loop 1120*b* is disposed, the radiation pattern for the first antenna 1100 of the antenna system 100 may also be radiated in the low elevation direction in addition to the upper bore site direction. Accordingly, it can be seen that transmission and reception characteristics at the low elevation are improved as the floating loop 1120*a* is disposed. Specifically, a height h2 by which the floating loop 1120*b* is spaced apart from the lower substrate 1010 may be about 6.4 mm. However, the height h2 may not be limited thereto and may vary depending on applications.

FIG. 8B illustrates a structure in which the loop antenna 1120*b* is formed to have a height higher than that of the second antenna 1200. The loop antenna 1120*b* may be disposed at a position, which is higher than a top of the second antenna 1200 by a predetermined height. Also, the loop antenna 1120*b* may be spaced apart from the lower circuit board by h2. Accordingly, the low elevation reception characteristic of the loop antenna 1120*b* in the elevation direction can be improved. This can improve the low elevation reception characteristic as well as the LB antenna characteristic in the antenna system including the first antenna and the second antenna.

Therefore, when the floating loop 1120*b* is disposed as illustrated in FIG. 12C, the radiation pattern for the first antenna 1100 may be radiated even in a lower elevation direction, compared to FIG. 12B. Accordingly, it can be seen that transmission and reception characteristics at the low elevation are improved as the floating loop 1120*b* is disposed to be spaced apart from the lower substrate 1010 by a predetermined distance. In this regard, the height h2 by which the floating loop 1120*b* is spaced apart from the lower substrate 1010 may be determined as an optimal height to optimize the low elevation characteristic. In one example, the height h2 by which the floating loop 1120*b* is spaced apart from the lower substrate 1010 may be set to be in the range of about 6 mm to 7 mm. Specifically, a height h2 by which the floating loop 1120*b* is spaced apart from the lower substrate 1010 may be about 6.4 mm. However, the present disclosure may not be limited thereto and may vary depending on applications.

The foregoing description has been given of the antenna system 1000 that can be mounted in the vehicle according to one aspect. Hereinafter, a vehicle equipped with an antenna system according to another aspect will be described. In this regard, the foregoing description of the antenna system may also be applied to the vehicle, and the description of the vehicle in which the antenna system is mounted may also be applied to the aforementioned antenna system.

Figure 13:
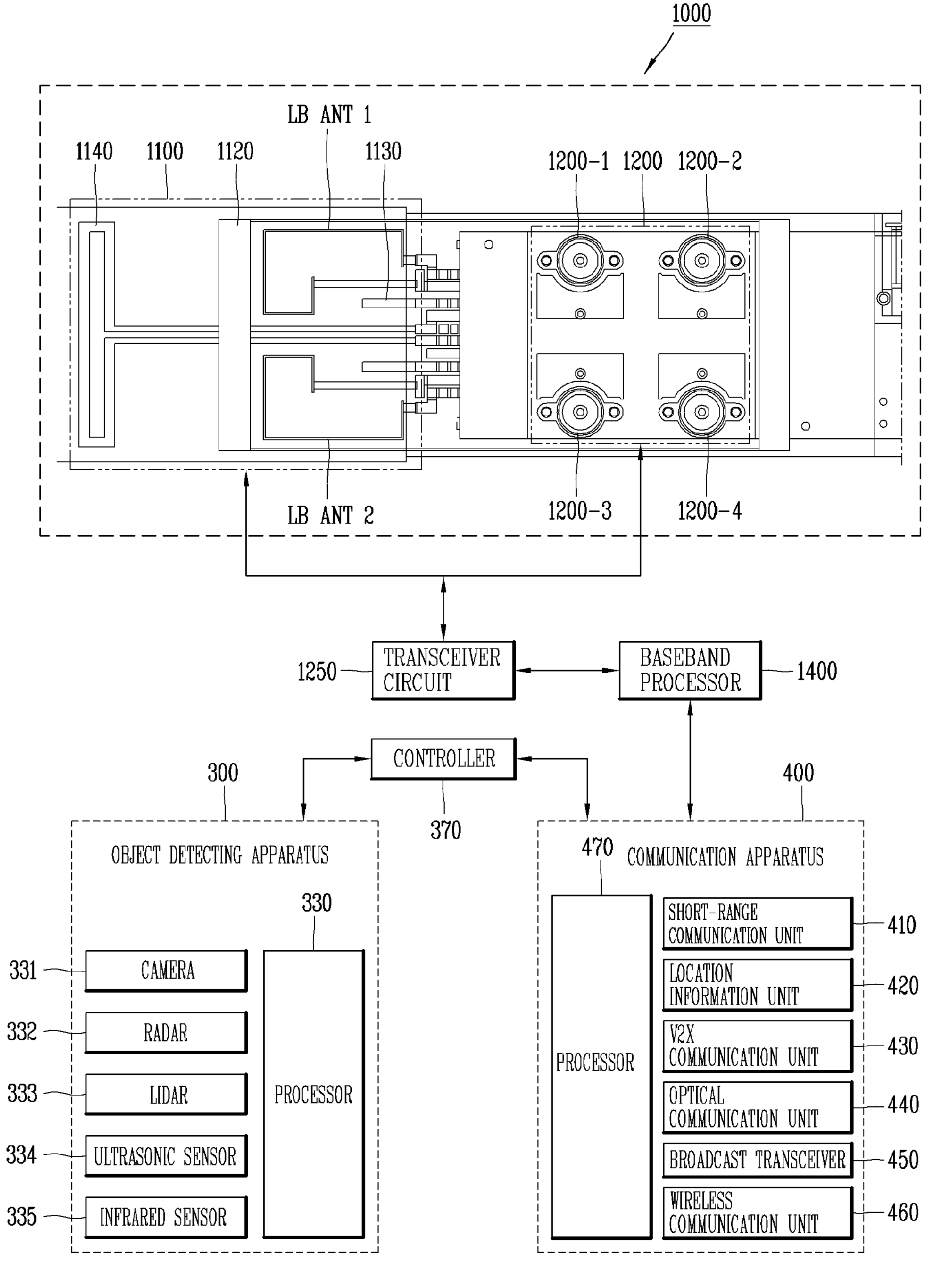
FIG. 13 is a view illustrating a configuration of a vehicle having an antenna system according to one example.

FIG. 13 is a view illustrating a configuration of a vehicle having an antenna system according to one example. Referring to FIGS. 1 to 13, a vehicle 300 may include an antenna system 1000 and a telematics module TCU. The telematics module TCU may include various components in addition to the object detecting apparatus 300 as illustrated in FIG. 3.

The antenna system mounted in the vehicle may include the transceiver circuit 1250 for controlling a signal to be radiated through at least one of the first antenna 1100 and the second antenna 1200. In addition, the antenna system mounted in the vehicle may further include a baseband processor 1400 configured to perform communication with at least one of an adjacent vehicle, a Road Side Unit (RSU), and a base station through the transceiver circuit 1250.

Meanwhile, when it is necessary to simultaneously receive information from various entities such as an adjacent vehicle, RSU, or base station for autonomous driving, etc., a broad reception can be allowed through MIMO. Accordingly, the vehicle can receive different information from various entities at the same time to improve a communication capacity. This can improve the communication capacity of the vehicle through the MIMO without a bandwidth extension.

Alternatively, the vehicle may simultaneously receive the same information from various entities, so as to improve reliability for surrounding information and reduce latency. Accordingly, URLLC (Ultra Reliable Low Latency Communication) can be performed in the vehicle and the vehicle can operate as a URLLC UE. To this end, a base station performing scheduling may preferentially allocate a time slot for the vehicle operating as the URLLC UE. For this, some of specific time-frequency resources already allocated to other UEs may be punctured.

As described above, the first antenna 1100 may operate in the low band LB through the first LB antenna 1100-1. The first antenna 1100 may also operate in the middle band MB in addition to the low band LB through the second LB antenna 1100-2. Here, the low band LB may be referred to as a first frequency band and the middle band MB and the high band HB may be referred to as a second frequency band. Accordingly, the baseband processor 1400 may perform MIMO through the first antenna 1100 and at least one of the plurality of cone antennas 1200-1 to 1200-4 in the second frequency band. Therefore, MIMO can be performed using different types of antennas spaced apart from each other by a sufficient distance. This can improve isolation between first and second signals within the same band.

The first antenna 1100 of the antenna system may operate as a radiator in the low band LB, which is the first frequency band. Also, the second antenna 1200 may operate as a radiator in the second frequency band higher than the first frequency band. Accordingly, the baseband processor 1400 may control the transceiver circuit 1250 to receive the first signal of the first frequency band through the first antenna 1100 and the second signal of the second frequency band through the second antenna 1200. Therefore, the baseband processor 1400 can perform carrier aggregation (CA) through a band in which the first frequency band and the second frequency band are combined with each other. When it is necessary to receive a large amount of data for autonomous driving and the like, a broadband reception can be allowed through the CA.

Accordingly, eMBB (Enhanced Mobile Broad Band) communication can be performed in the vehicle and the vehicle can operate as an eMBB UE. To this end, a base station performing scheduling may preferentially allocate broadband frequency resources for the vehicle operating as the eMBB UE. For this purpose, CA may be performed on extra frequency bands except for frequency resources already allocated to other UEs.

The antenna system according to the present disclosure may be mounted in the vehicle in the structure illustrated in FIGS. 2A to 2C. That is, the broadband antenna system mounted to the vehicle may be mounted on a roof of the vehicle, inside the roof, or inside a roof frame, as illustrated in FIGS. 2A to 2C.

FIG. 13 is a block diagram illustrating a broadband antenna system and a vehicle in which the antenna system is mounted according to the present disclosure. Referring to FIG. 13, the vehicle 300 in which the broadband antenna system is mounted may have the antenna system 1000 mounted thereto. The antenna system 1000 may perform short-range communication, wireless communication, V2X communication, and the like by itself or through the communication apparatus 400. To this end, the baseband processor 1400 may be configured to receive signals from or transmit signals to adjacent vehicles, RSUs, and base stations through the antenna system 1000.

Alternatively, the baseband processor 1400 may be configured to receive signals from or transmit signals to adjacent vehicles, RSUs, and base stations through the communication apparatus 400. Here, the information related to adjacent objects may be acquired through the object detecting apparatus such as the camera 331, the radar 332, the LiDar 333, and the sensors 334 and 335 of the vehicle 300. Alternatively, the baseband processor 1400 may be configured to receive signals from or transmit signals to adjacent vehicles, RSUs, and base stations through the communication apparatus 400 and the antenna system 1000.

Referring to FIGS. 1 to 13, the vehicle 300 including the antenna system 1000 may include the first antenna 1100, the second antenna 1200, the transceiver circuit 1250, and the baseband processor 1400.

The baseband processor 1400 may control the transceiver circuit 1250 to receive the first signal of the first frequency band through the first antenna 1100 and the second signal of the second frequency band through the second antenna 1200. Therefore, the baseband processor 1400 can perform carrier aggregation (CA) through a band in which the first frequency band and the second frequency band are combined with each other.

The transceiver circuit 1250 may be controlled to radiate a signal through at least one of the first antenna and the second antenna. The baseband processor 1400 may perform communication with at least one of an adjacent vehicle, a Road Side Unit (RSU), and a base station through the transceiver circuit 1250.

The first antenna 1100 may include the plurality of conductive members 1110 and the loop antenna 1120. The loop antenna 1120 may be configured in a loop shape to surround the plurality of conductive members 1110 so that signals from the plurality of conductive members 1110 are coupled.

The first antenna 1100 may include the first LB antenna 1100-1 and the second LB antenna 1100-2. The first LB antenna 1100-1 may include a plurality of conductive members, and implement a closed loop with one end connected to a feeding line and another end connected to the ground. In addition, the second LB antenna 1100-2 may include a plurality of conductive members, and implement a closed loop with one end connected to a second feeding line and another end connected to the ground.

The loop antenna 1120 may include the vertical loop antenna V-loop and the horizontal loop antenna H-loop. The vertical loop antenna V-loop may surround a region where the first antenna 1100 and the second antenna 1200 are disposed, and may be substantially perpendicular to the lower substrate 1010. The horizontal loop antenna H-loop may be connected to the vertical loop antenna V-loop and disposed substantially parallel to the lower substrate 1010. In this case, the horizontal loop antenna H-loop may be disposed between ends of the plurality of conductive members 1100 and a radiation loop region (RLR) of an RKE antenna 1140.

The vertical loop antenna V-loop and the plurality of conductive members 1110 may be disposed substantially parallel to each other. In this case, a height of the vertical loop antenna V-loop may be higher than a height of the plurality of conductive members 1110. This can improve the signal reception performance of the first frequency band in the horizontal direction in which the antenna system 1000 is mounted.

As aforementioned, the first antenna 1100 may operate as a radiator in the low band LB that is the first frequency band, and the second antenna 1200 may operate as a radiator in the second frequency band that is higher than the first frequency band. The baseband processor 1400 may control the transceiver circuit 1250 to receive the first signal of the first frequency band from a first entity through the first antenna 1100 and the second signal of the second frequency band from a second entity through the second antenna 1200. Accordingly, the baseband processor 1400 can perform communication with a base station as the first entity and V2V communication with another vehicle as the second entity.

In the above, the antenna system mounted on the vehicle and the vehicle equipped with the antenna system have been described. Hereinafter, technical effects of the antenna system mounted on the vehicle and the vehicle equipped with the antenna system will be described.

According to the present disclosure, a radiation pattern of a low band (LB) antenna can be improved in a horizontal direction in the antenna system mounted on the vehicle.

Also, radiation efficiency can be improved while the LB antenna can operate in a wide frequency band in the antenna system mounted on the vehicle.

In addition, interference between different antennas can be reduced in the antenna system mounted on the vehicle.

According to an implementation, a structure for mounting an antenna system, which can operate in a wide frequency band, to a vehicle can be provided to support various communication systems by implementing a low band (LB) antenna and other antennas in one antenna module.

According to an implementation, the antenna system can be optimized with different antennas in the low band LB and other bands. This can result in arranging the antenna system with optimal configuration and performance in a roof frame of the vehicle.

According to the present disclosure, the antenna system of the vehicle can implement MIMO and diversity operations using a plurality of antennas in specific bands.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

In relation to the aforementioned present disclosure, design and operations of a plurality of antennas of an antenna system mounted in a vehicle and a configuration performing the control of those antennas can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. An antenna system mounted on a vehicle, the antenna system comprising:

a first antenna including a plurality of conductive members and operating as a radiator in a first frequency band;

a floating loop antenna disposed to surround the plurality of conductive members; and a transceiver circuit configured to control a signal to be radiated through at least one of the first antenna and the floating loop antenna, and wherein the first antenna comprises:

a first low band (LB) antenna connected to a first feeding line and a first point of a ground to implement a first loop antenna type; and a second LB antenna connected to a second feeding line and a second point of the ground to implement a second loop antenna type, wherein the first feeding line is disposed adjacent to a first conductive member of the floating loop antenna, wherein the second feeding line is disposed adjacent to a second conductive member of the floating loop antenna, wherein the first conductive member of the floating loop antenna is disposed at a position opposite from a position of the second conductive member of the floating loop antenna, and wherein the first point of the ground is disposed adjacent to the second point of the ground.

2. The antenna system of claim 1, further comprising:

a first Wireless Local Area Network (WLAN) antenna and a second WLAN antenna disposed between the first LB antenna and the second LB antenna, and each including a conductive member disposed parallel to a lower substrate.

3. The antenna system of claim 2, further comprising:

a Remote Keyless Entry (RKE) antenna disposed between the first WLAN antenna and the second WLAN antenna inside the floating loop antenna, and having one end connected to a feeding line and another end connected to the ground to implement a closed loop on an outer side of the floating loop antenna, wherein a radiation loop region defined by the RKE antenna is formed in a boundary region of the antenna system rather than a region in which the floating loop antenna is disposed.

4. The antenna system of claim 3, wherein the floating loop antenna comprises:

a vertical loop antenna surrounding a region in which the first antenna is disposed, and disposed substantially perpendicular to the lower substrate; and a horizontal loop antenna connected to the vertical loop antenna and disposed substantially parallel to the lower substrate, and wherein the horizontal loop antenna is disposed between ends of the plurality of conductive members and the radiating loop region of the RKE antenna.

5. The antenna system of claim 4, wherein the vertical loop antenna and the first LB antenna are disposed parallel to each other, and wherein a height of the vertical loop antenna is higher than a height of the first LB antenna, so as to improve signal reception performance of the first frequency band in a horizontal direction in which the antenna system is mounted.

6. The antenna system of claim 4, further comprising:

a second antenna disposed in the antenna system and operating in a second frequency band higher than the first frequency band, wherein the second antenna comprises:

a plurality of cone radiators;

metal patches, each of the metal patches being spaced apart from each of the plurality of cone radiators by predetermined distances so as to be coupled to signals from upper apertures of the plurality of cone radiators; and shorting pins configured to connect the metal patches and the lower substrate.

7. The antenna system of claim 6, wherein the metal patches include first to fourth metal patches and the shorting pins include first to fourth shorting pins are disposed in a vertical symmetrical shape with respect to a center line in a horizontal direction of the antenna system, wherein the first and second metal patches are disposed on a lower portion of first and second cone radiators, of the plurality of cone radiators, disposed on an upper portion of the second antenna, and wherein the third and fourth metal patches are disposed on an upper portion of third and fourth cone radiators, of the plurality of cone radiators, disposed on a lower portion of the second antenna, so as to reduce interference between the plurality of cone radiators.

8. The antenna system of claim 6, wherein the vertical loop antenna is located at a position higher than a position where the plurality of cone radiators are disposed, so as to improve signal reception performance of the first frequency band in a horizontal direction in which the antenna system is mounted, and wherein interference with the second antenna in the second frequency band is maintained to be equal to or lower than a threshold.

9. The antenna system of claim 6, further comprising a baseband processor connected to the transceiver circuit and configured to control the transceiver circuit to perform multiple-input/multi-output (MIMO) through the first antenna in the first frequency band.

10. The antenna system of claim 9, wherein the baseband processor controls the transceiver circuit to perform MIMO through the second antenna in the second frequency band when signal quality received through the first antenna is equal to or lower than a threshold.

11. The antenna system of claim 6, wherein the second antenna comprises a plurality of cone antennas including cone radiators and patch antennas, and wherein the antenna system further comprises a baseband processor configured to perform MIMO through the plurality of cone antennas.

12. The antenna system of claim 11, wherein the baseband processor performs MIMO in the first frequency band through the first antenna and at least one of the plurality of cone antennas.

13. The antenna system of claim 6, wherein the first antenna operates as the radiator in the first frequency band, and the second antenna operates as the radiator in the second frequency band, the second frequency band higher than the first frequency band, and wherein the antenna system further comprises a baseband processor configured to perform carrier aggregation (CA) by receiving a first signal of the first frequency band through the first antenna and a second signal of the second frequency band through the second antenna.

14. A vehicle having an antenna system, the vehicle comprising:

a first antenna including a plurality of conductive members and operating as a radiator in a first frequency band;

a floating loop antenna disposed to surround the plurality of conductive members;

a transceiver circuit configured to control a signal to be radiated through at least one of the first antenna and the floating loop antenna; and a baseband processor configured to communicate with at least one of an adjacent vehicle, a Road Side Unit (RSU), and a base station through the transceiver circuit, wherein the first antenna comprises:

a first low band (LB) antenna connected to a first feeding line a first point of a ground to implement a first loop antenna type; and a second LB antenna connected to a second feeding line and a second point of the ground to implement a second loop antenna type, wherein the first feeding line is disposed adjacent to a first conductive member of the floating loop antenna, wherein the second feeding line is disposed adjacent to a second conductive member of the floating loop antenna, wherein the first conductive member of the floating loop antenna is disposed at a position opposite from a position of the second conductive member of the floating loop antenna, and wherein the first point of the ground is disposed adjacent to the second point of the ground.

* * * * *